(12) United States Patent
Sato et al.

(10) Patent No.: US 10,091,427 B2
(45) Date of Patent: Oct. 2, 2018

(54) IMAGE PICKUP APPARATUS TO PERFORM A PROCESS BASED ON STATE TRANSITION OF VIEWFINDER

(71) Applicant: SONY CORPORATION, Tokyo (JP)

(72) Inventors: Mayuko Sato, Tokyo (JP); Fumikazu Hatanaka, Tokyo (JP); Toshiyuki Kaimi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 32 days.

(21) Appl. No.: 15/307,631

(22) PCT Filed: Apr. 9, 2015

(86) PCT No.: PCT/JP2015/001997
§ 371 (c)(1),
(2) Date: Oct. 28, 2016

(87) PCT Pub. No.: WO2015/170443
PCT Pub. Date: Nov. 12, 2015

(65) Prior Publication Data
US 2017/0054916 A1    Feb. 23, 2017

(30) Foreign Application Priority Data

May 8, 2014   (JP) ................................ 2014-097046
May 15, 2014  (JP) ................................ 2014-101709

(51) Int. Cl.
*H04N 5/232*   (2006.01)
*H04N 5/225*   (2006.01)
(Continued)

(52) U.S. Cl.
CPC ......... *H04N 5/23293* (2013.01); *G03B 17/04* (2013.01); *H04N 5/2251* (2013.01); *G03B 13/08* (2013.01); *H04N 5/2256* (2013.01)

(58) Field of Classification Search
CPC ...... G03B 13/08; G03B 17/04; H04N 5/2251; H04N 5/2256; H04N 5/23293
See application file for complete search history.

(56) References Cited

U.S. PATENT DOCUMENTS 5,146,253 A * 9/1992 Swayze .................. G03B 13/06
                                                    396/349
5,701,535 A * 12/1997 Reibl ..................... G03B 13/06
                                                    396/348

(Continued)

FOREIGN PATENT DOCUMENTS

JP    2002-094871 A    3/2002

OTHER PUBLICATIONS

International Search Report and Written Opinion of PCT Application No. PCT/JP2015/001997, dated Aug. 25, 2015, 13 pages of ISRWO.

*Primary Examiner* — Amy Hsu
(74) *Attorney, Agent, or Firm* — Chip Law Group

(57) ABSTRACT

There is provided an image pickup apparatus including: a main body provided with an image pickup section; a viewfinder having a main body part and a movable part, the viewfinder being capable of performing state transition in which the movable part moves in a first direction with respect to the main body part, to reach a usage state; and a control section configured to perform processing based on the state transition.

19 Claims, 19 Drawing Sheets

(51) Int. Cl.
*G03B 17/04* (2006.01)
*G03B 13/08* (2006.01)

(56) References Cited

U.S. PATENT DOCUMENTS

| | | | | |
|---|---|---|---|---|
| 6,937,281 B1* | 8/2005 | Ogawa | ............... | H04N 5/23293 |
| | | | | 348/333.11 |
| 6,952,232 B2* | 10/2005 | Ko | ................ | H04N 5/2251 |
| | | | | 348/341 |
| 7,224,395 B2* | 5/2007 | Kato | ................ | H04N 5/2254 |
| | | | | 348/341 |
| 8,174,606 B2* | 5/2012 | Hwang | ................ | G03B 13/02 |
| | | | | 348/335 |
| 9,413,968 B2* | 8/2016 | Shirono | ............. | H04N 5/23293 |
| 2002/0196358 A1* | 12/2002 | Kim | ................ | H04N 5/2251 |
| | | | | 348/333.06 |
| 2007/0182846 A1* | 8/2007 | Uchida | ................ | G11B 27/105 |
| | | | | 348/376 |
| 2010/0061702 A1* | 3/2010 | Tanaka | ................ | G11B 27/329 |
| | | | | 386/241 |
| 2015/0029380 A1* | 1/2015 | Noh | ................ | G03B 13/02 |
| | | | | 348/333.01 |

* cited by examiner

[ FIG. 1 ]
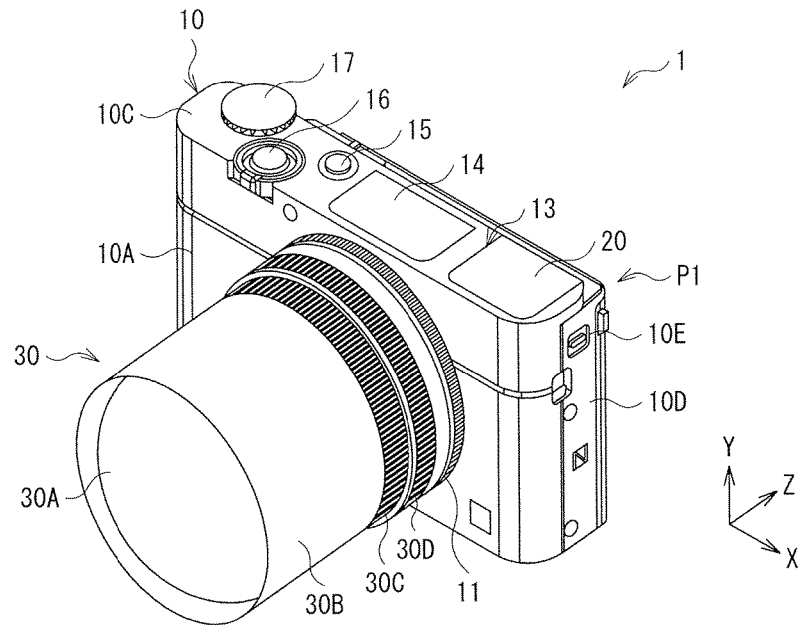
[ FIG. 2 ]
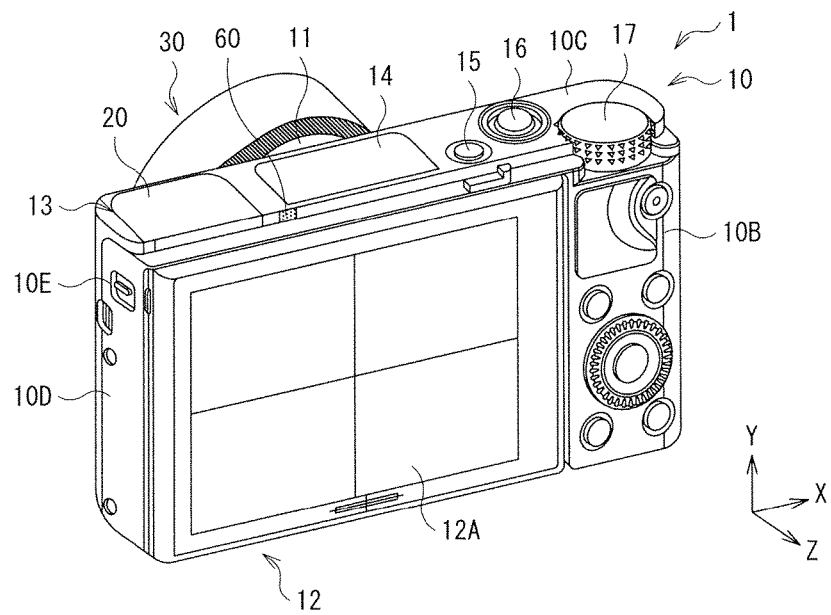

[ FIG. 3 ]
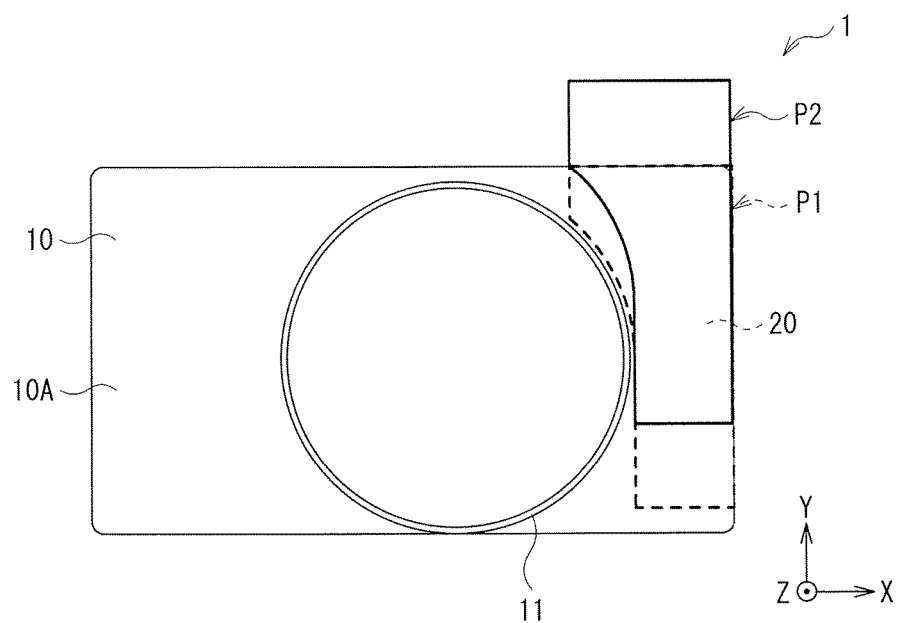

[ FIG. 4 ]
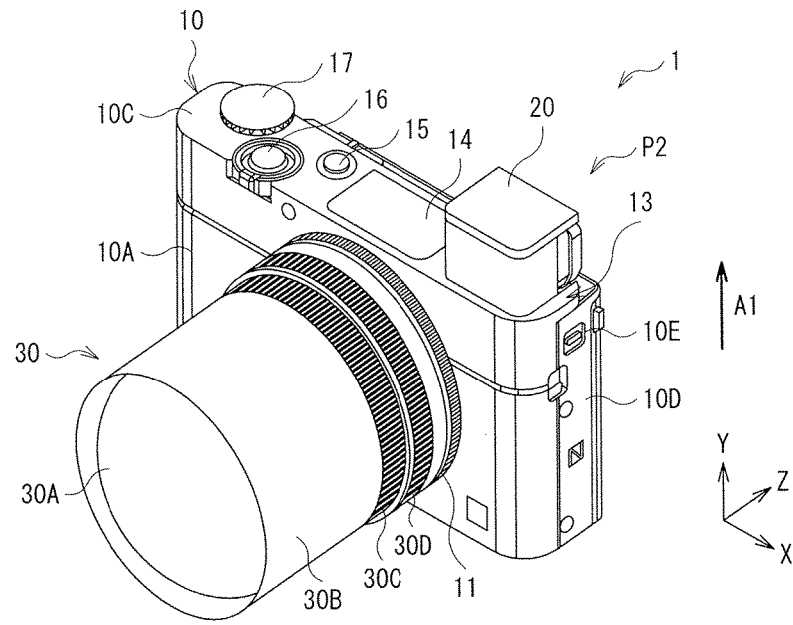
[ FIG. 5 ]
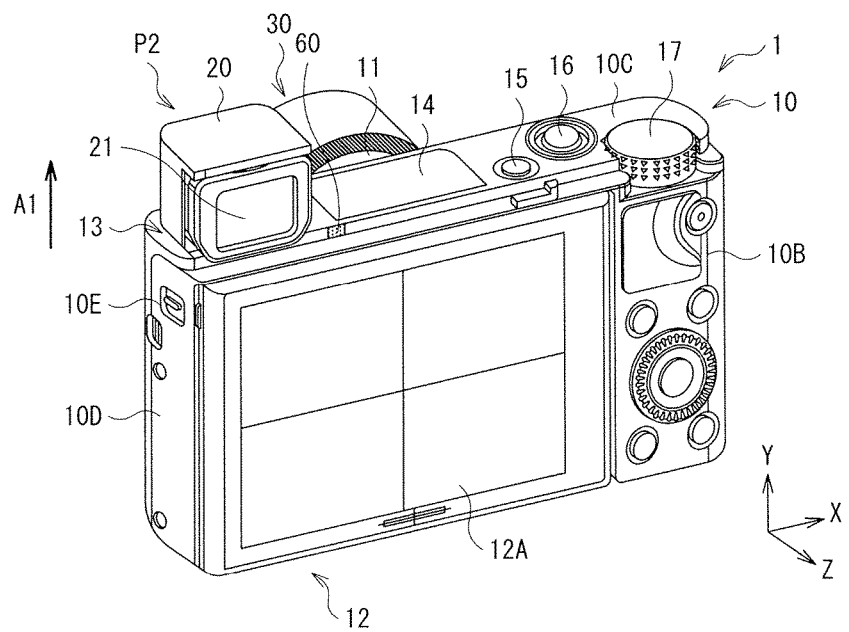

[ FIG. 6 ]
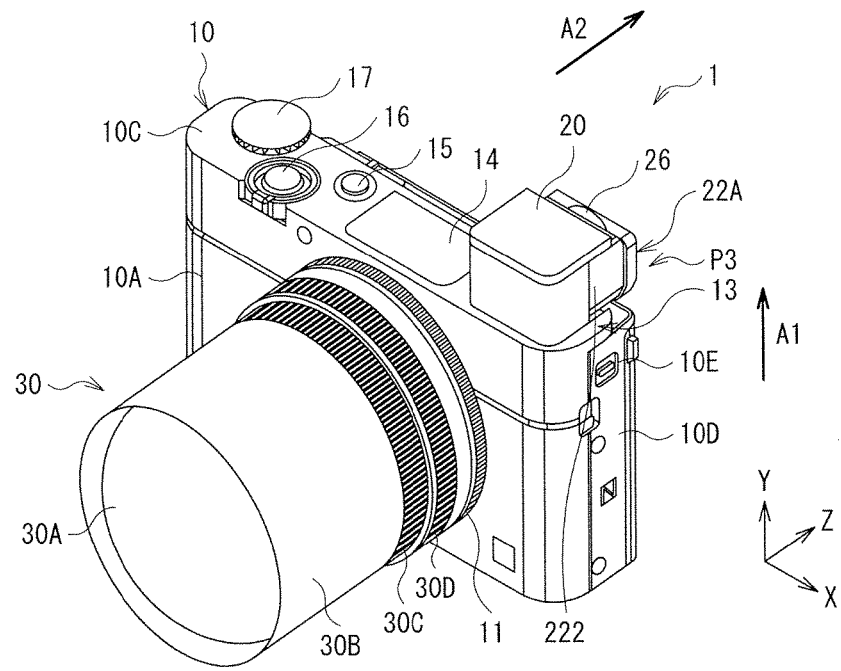
[ FIG. 7 ]
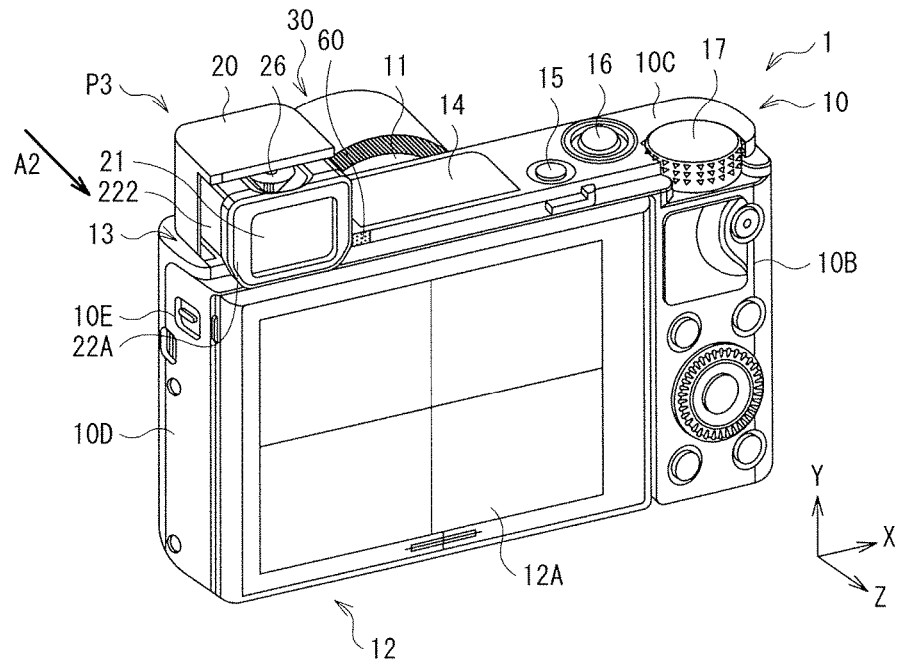

[FIG. 8]
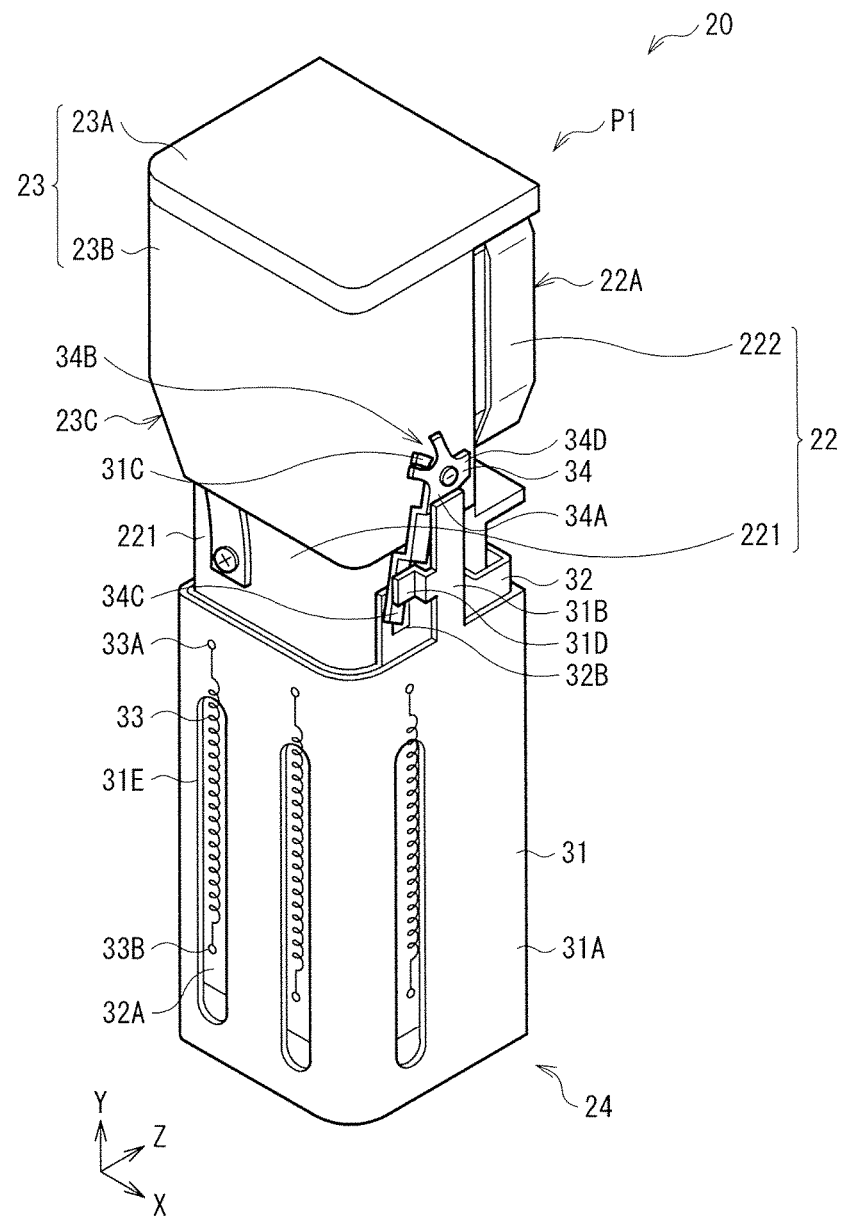

[FIG. 9]
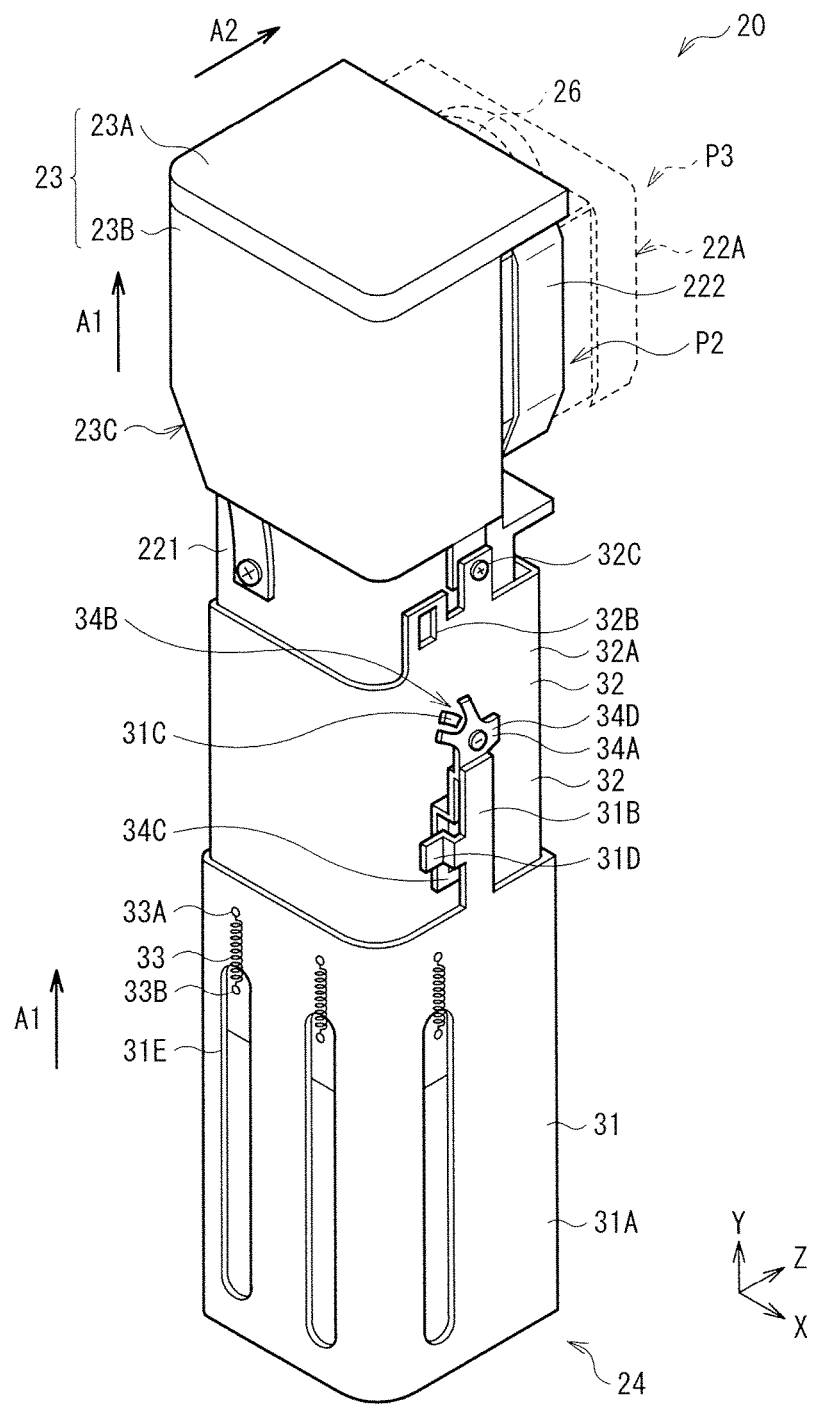

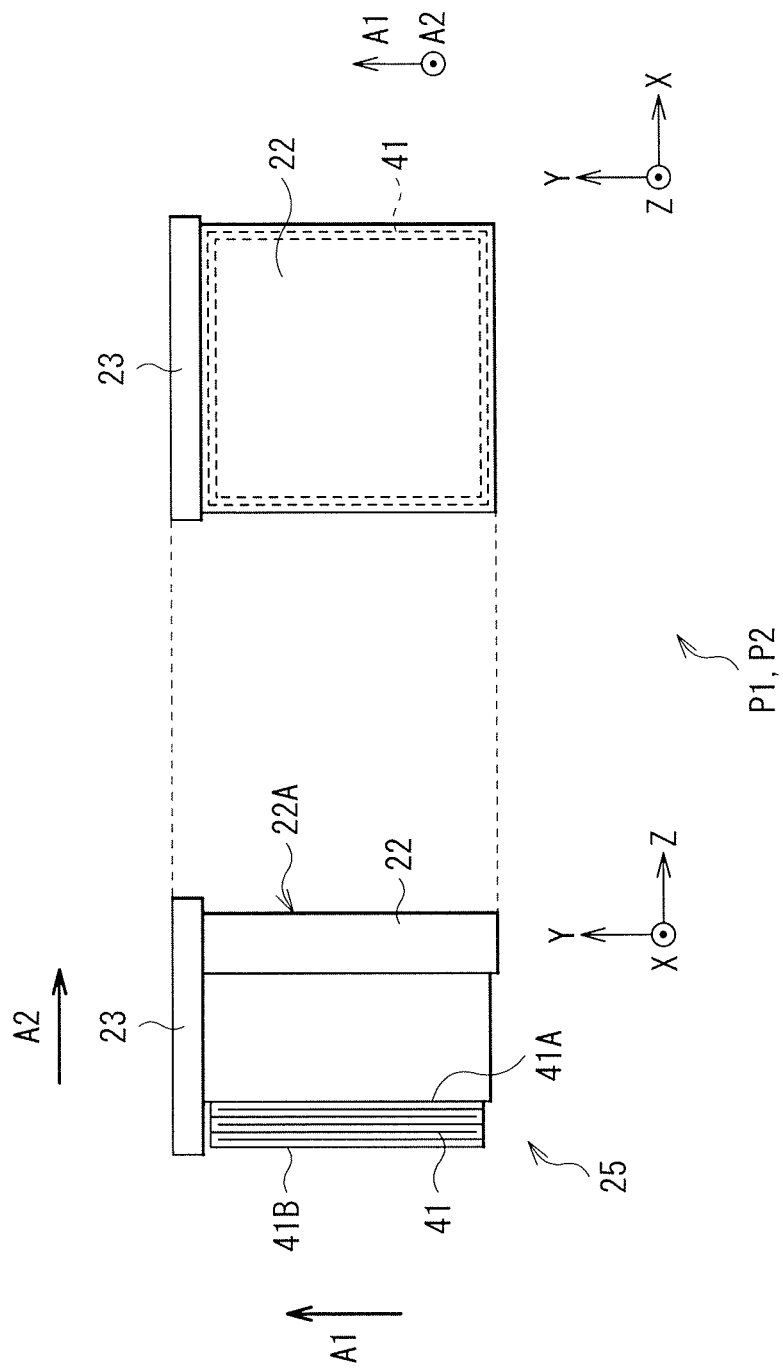
[ FIG. 10A ]

[ FIG. 10B ]
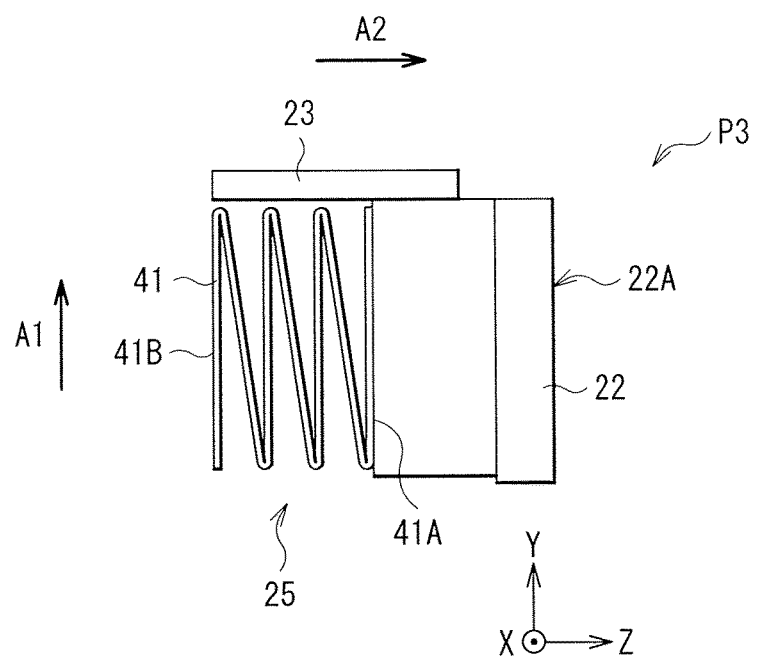

[ FIG. 11A ]
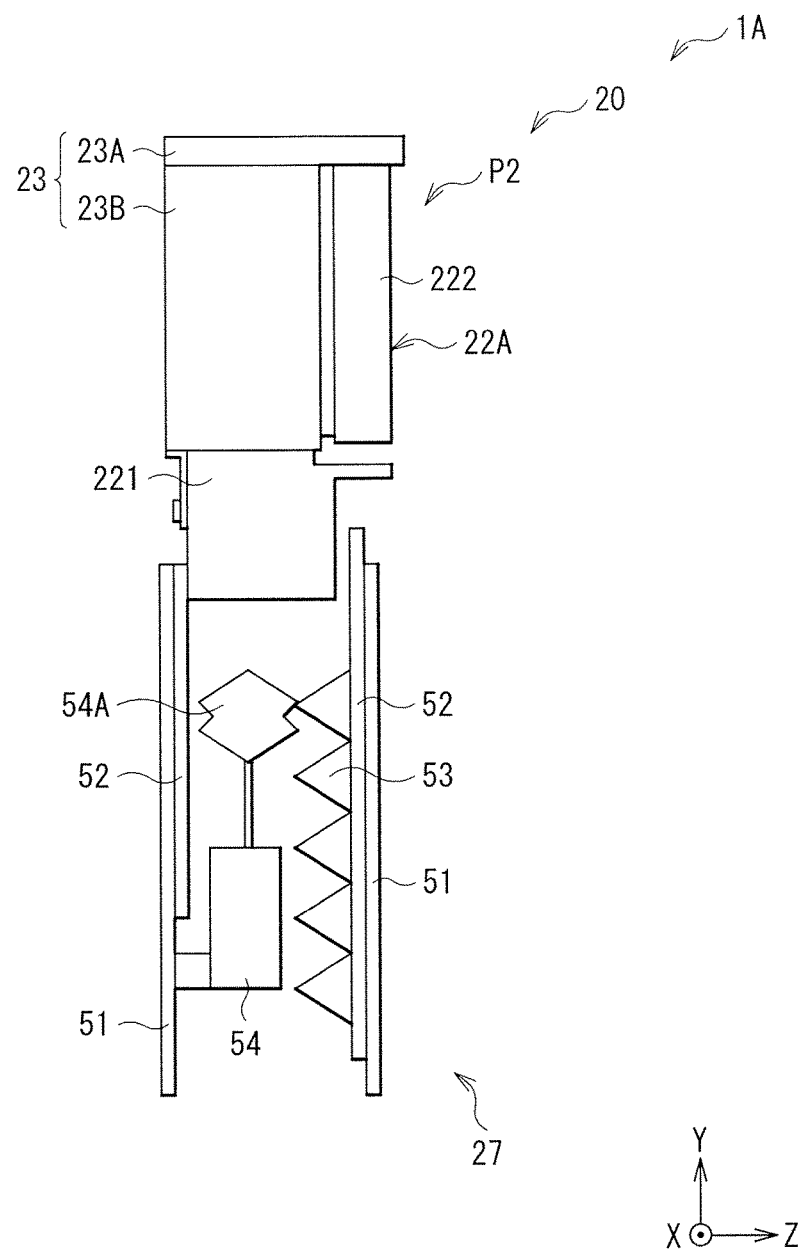

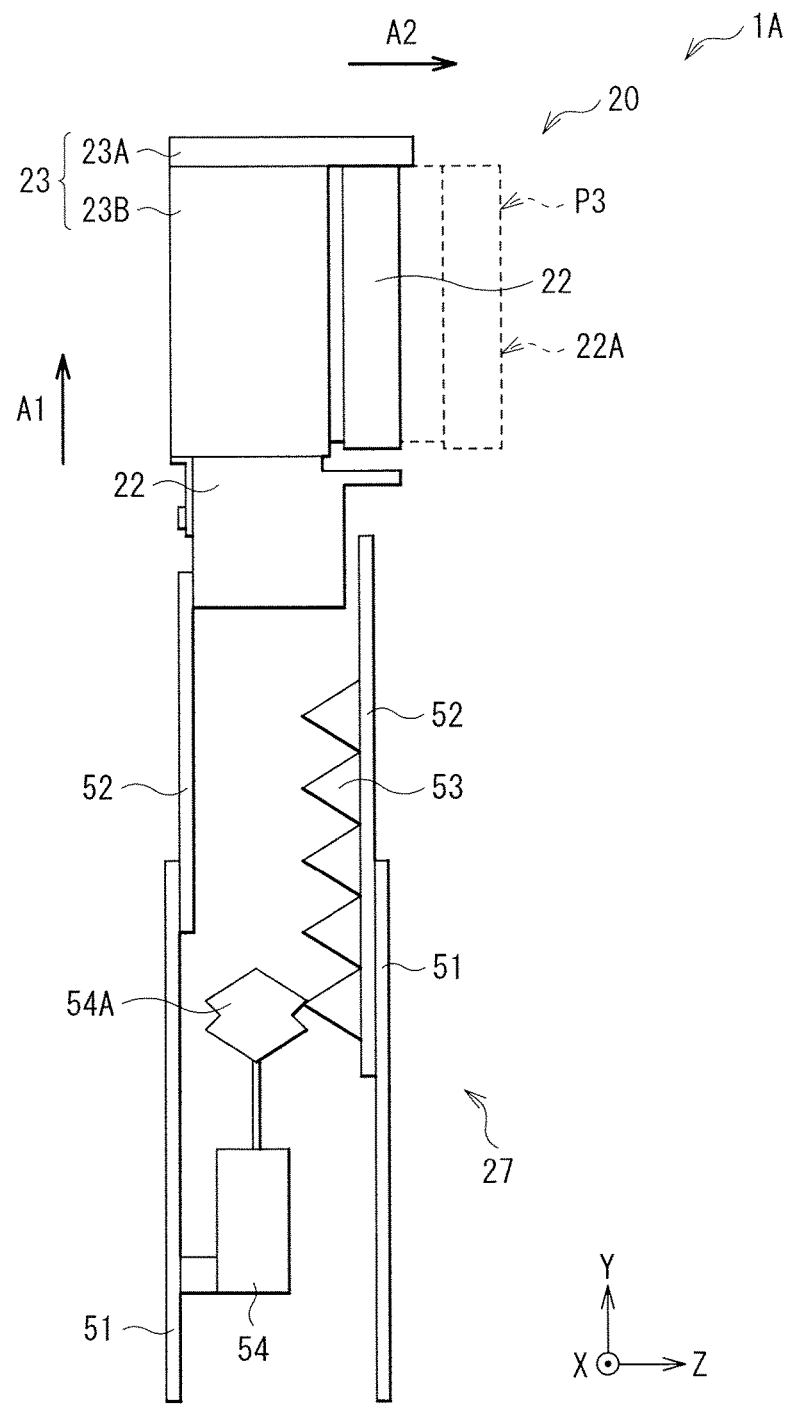
[FIG. 11B]

[ FIG. 12 ]
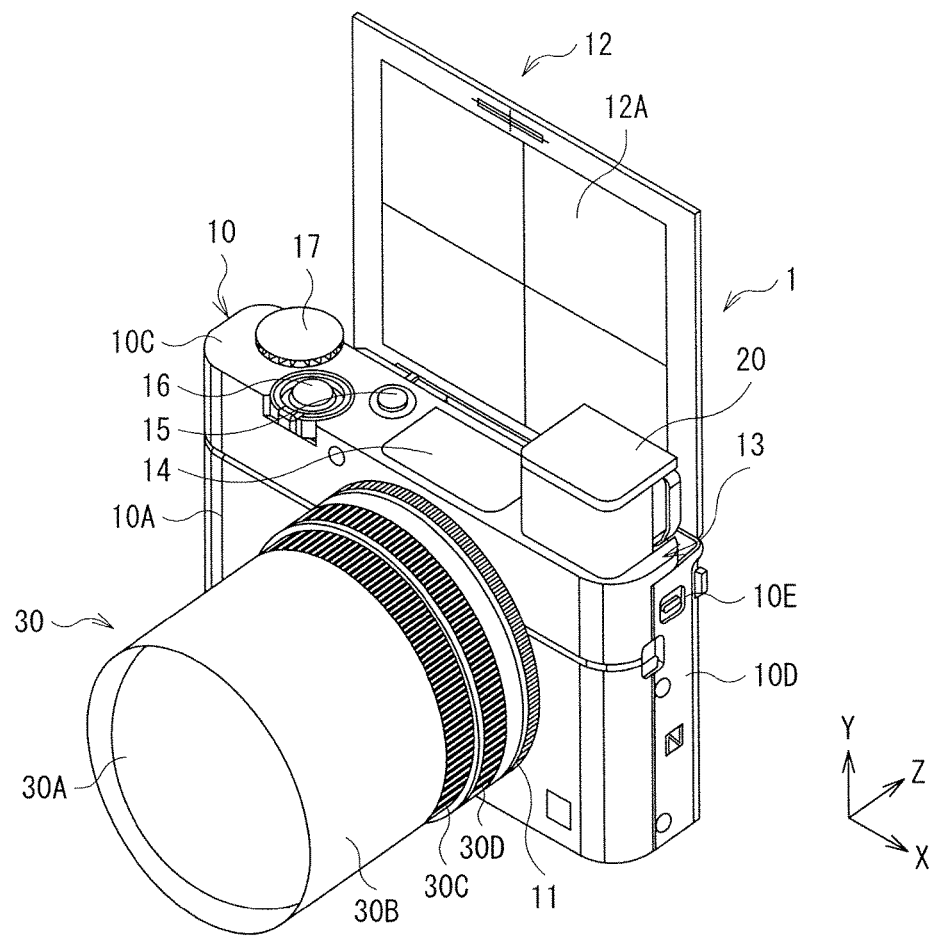

[ FIG. 13A ]
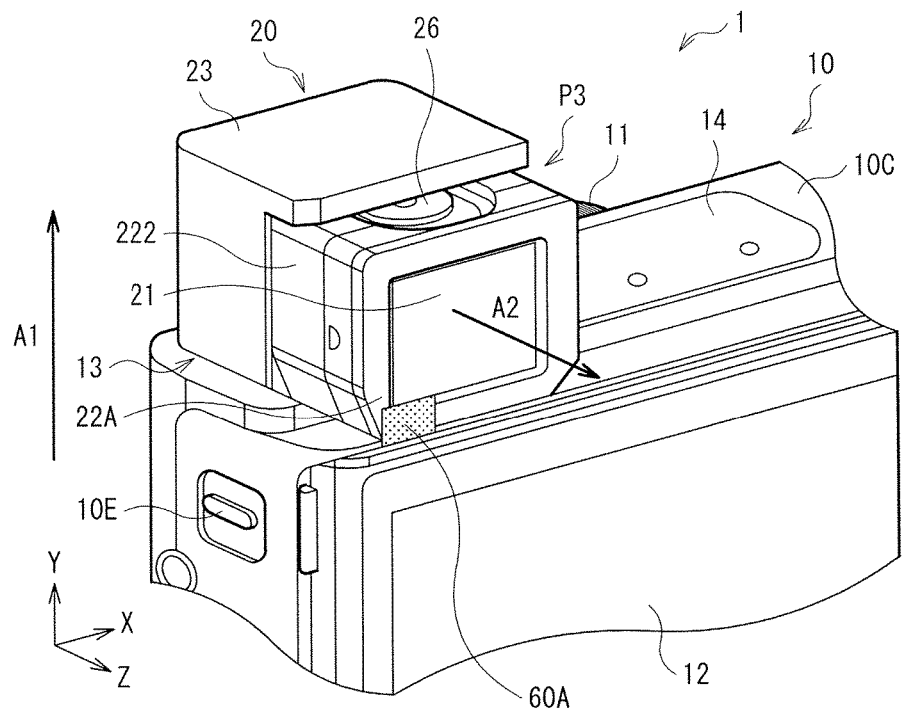
[ FIG. 13B ]
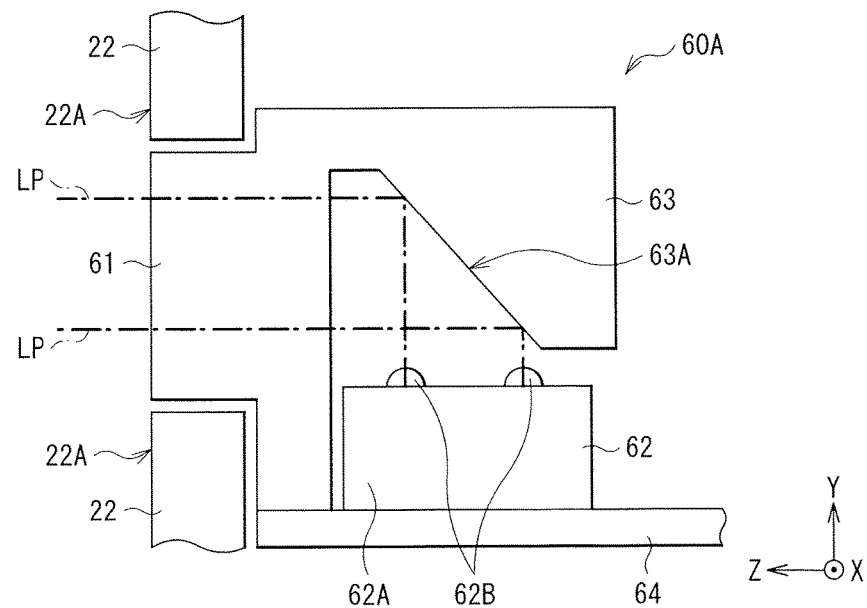

[ FIG. 14 ]
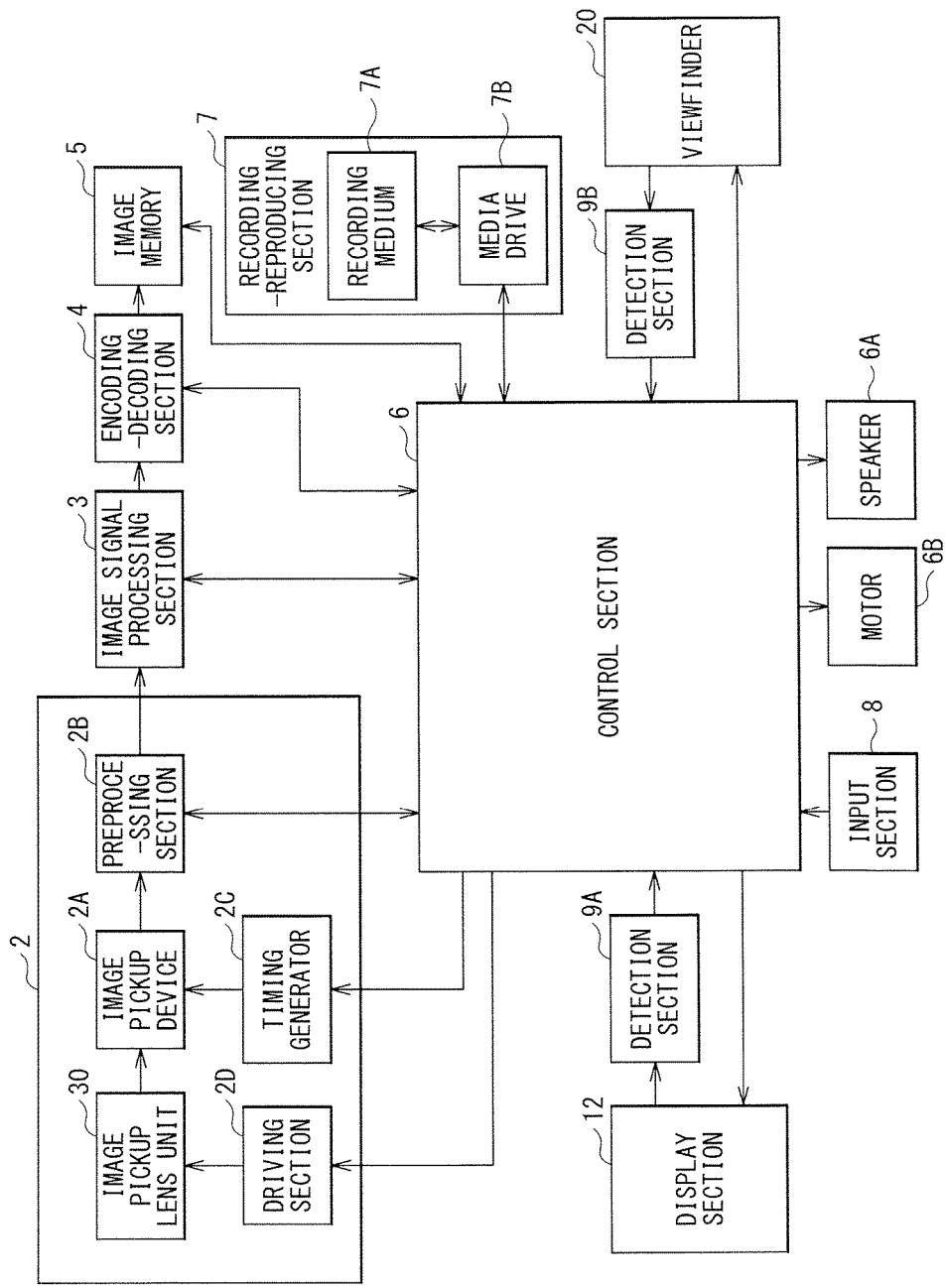

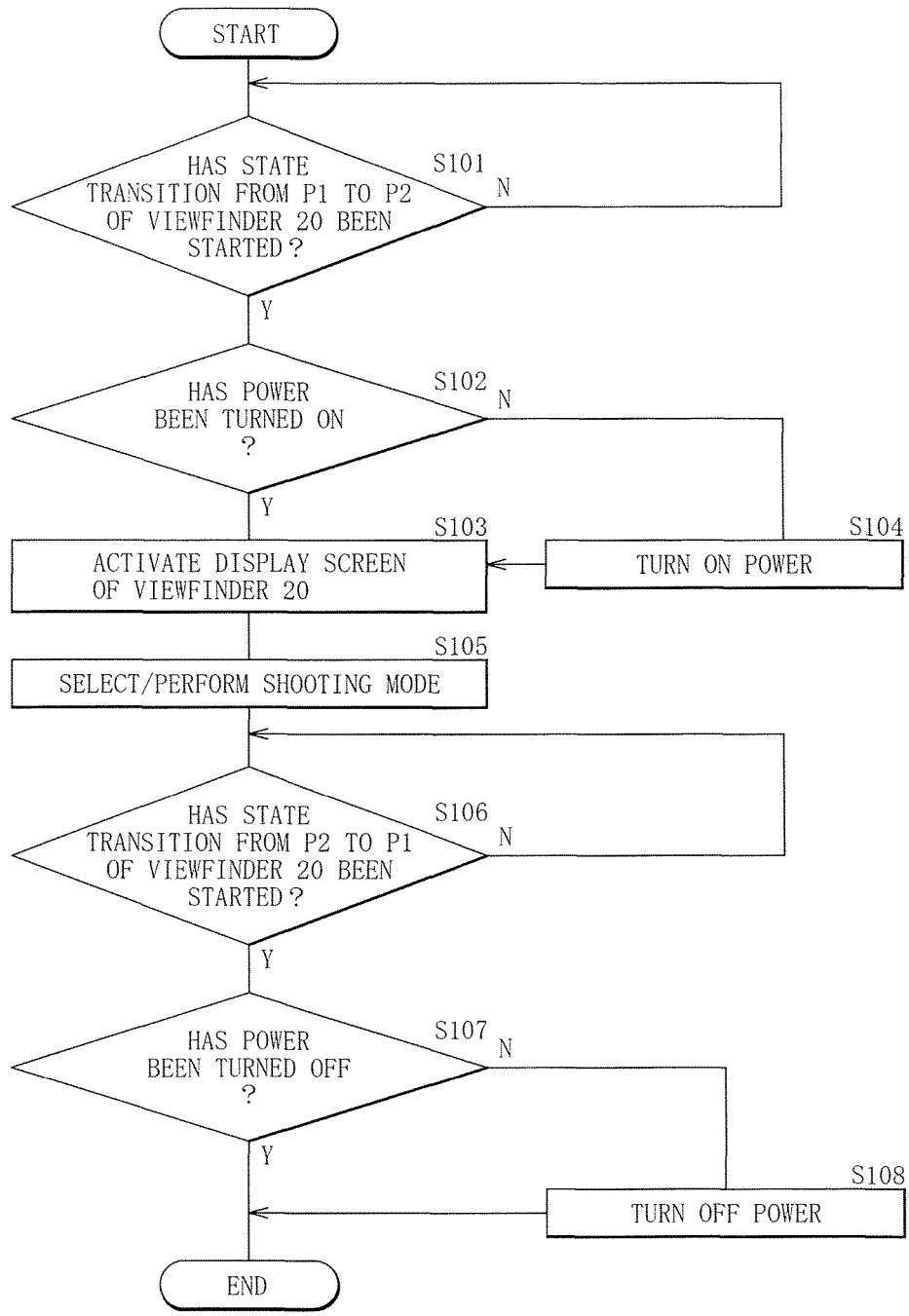
[ FIG. 15 ]

[ FIG. 16A ]
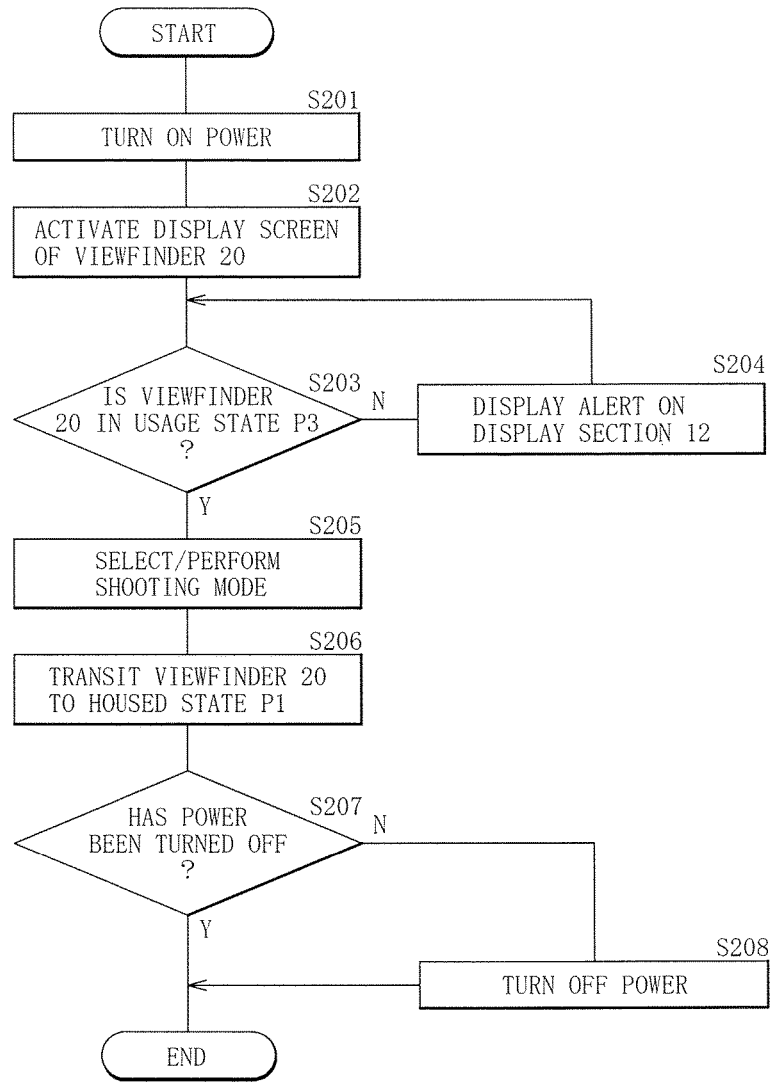

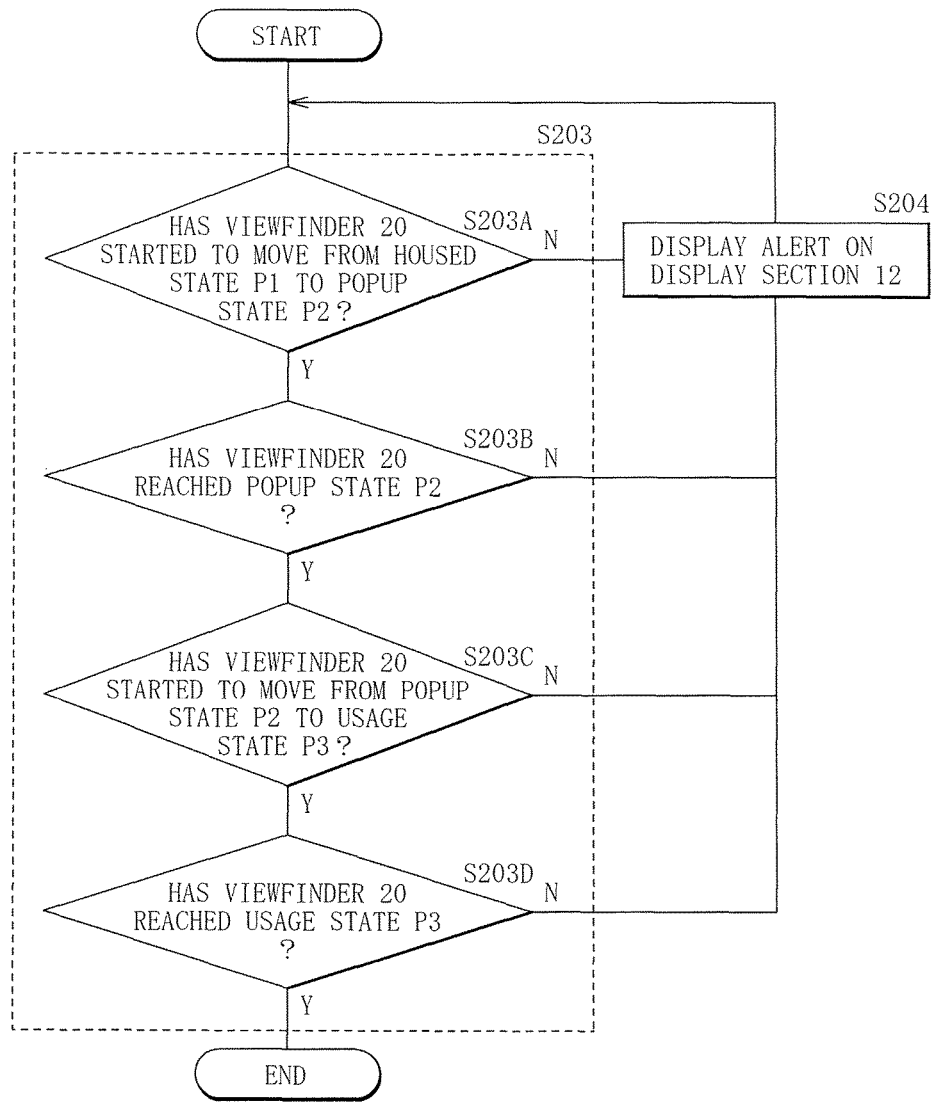
[ FIG. 16B ]

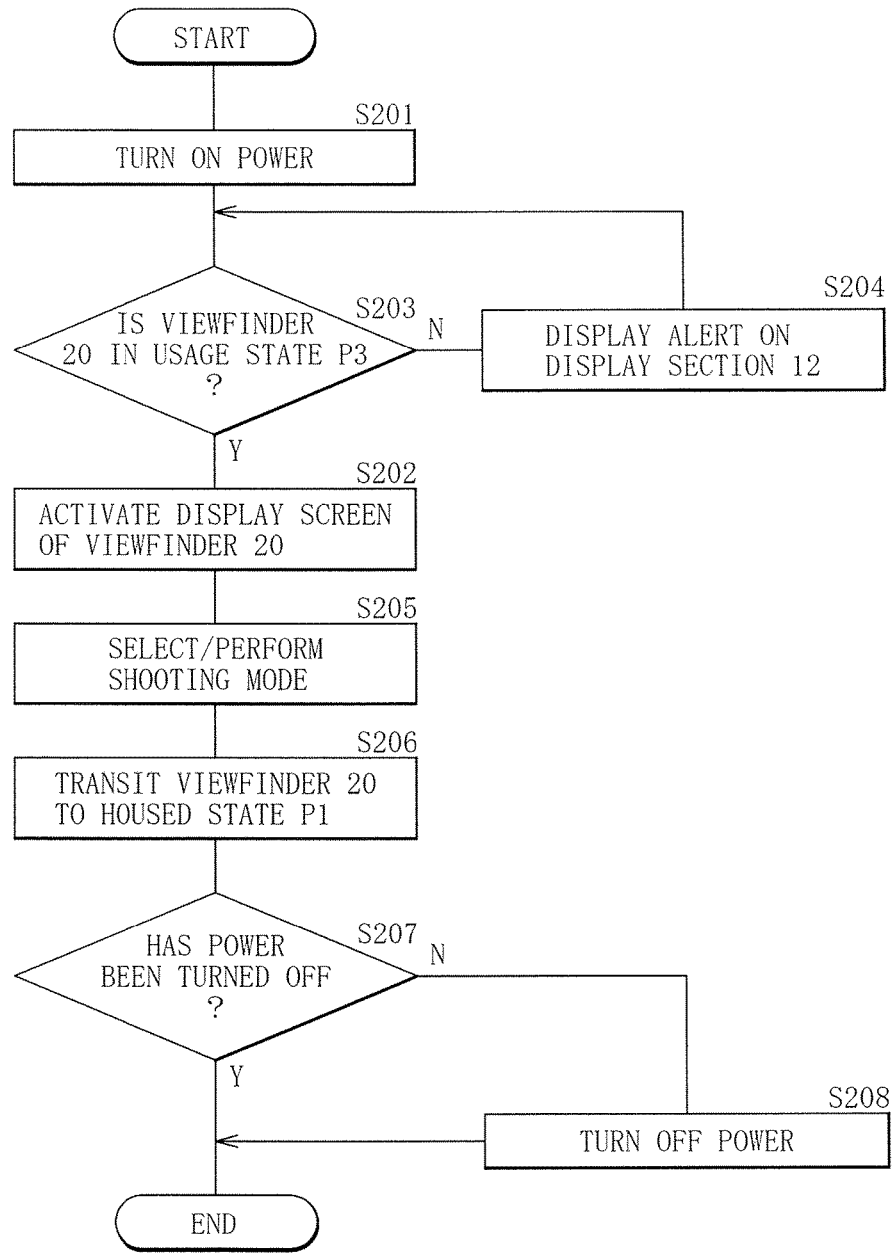
[ FIG. 16C ]

[ FIG. 17A ]
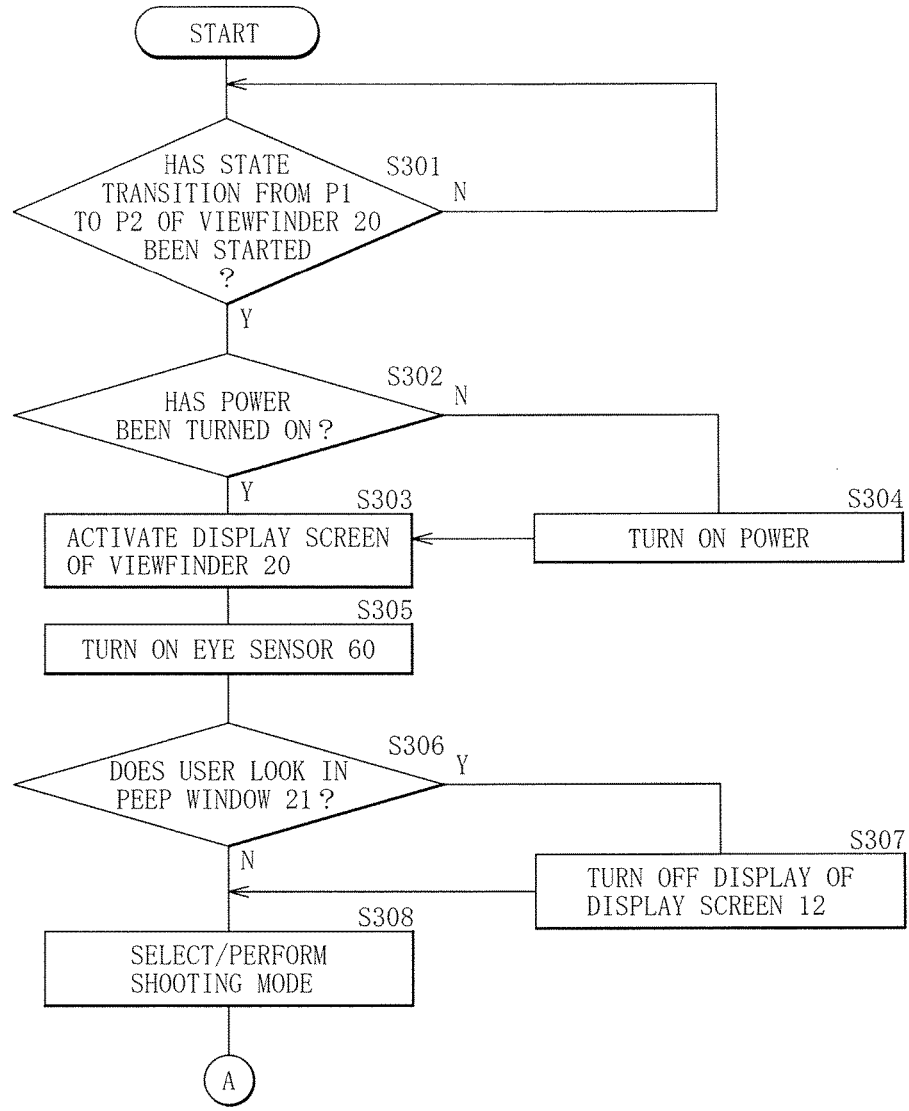

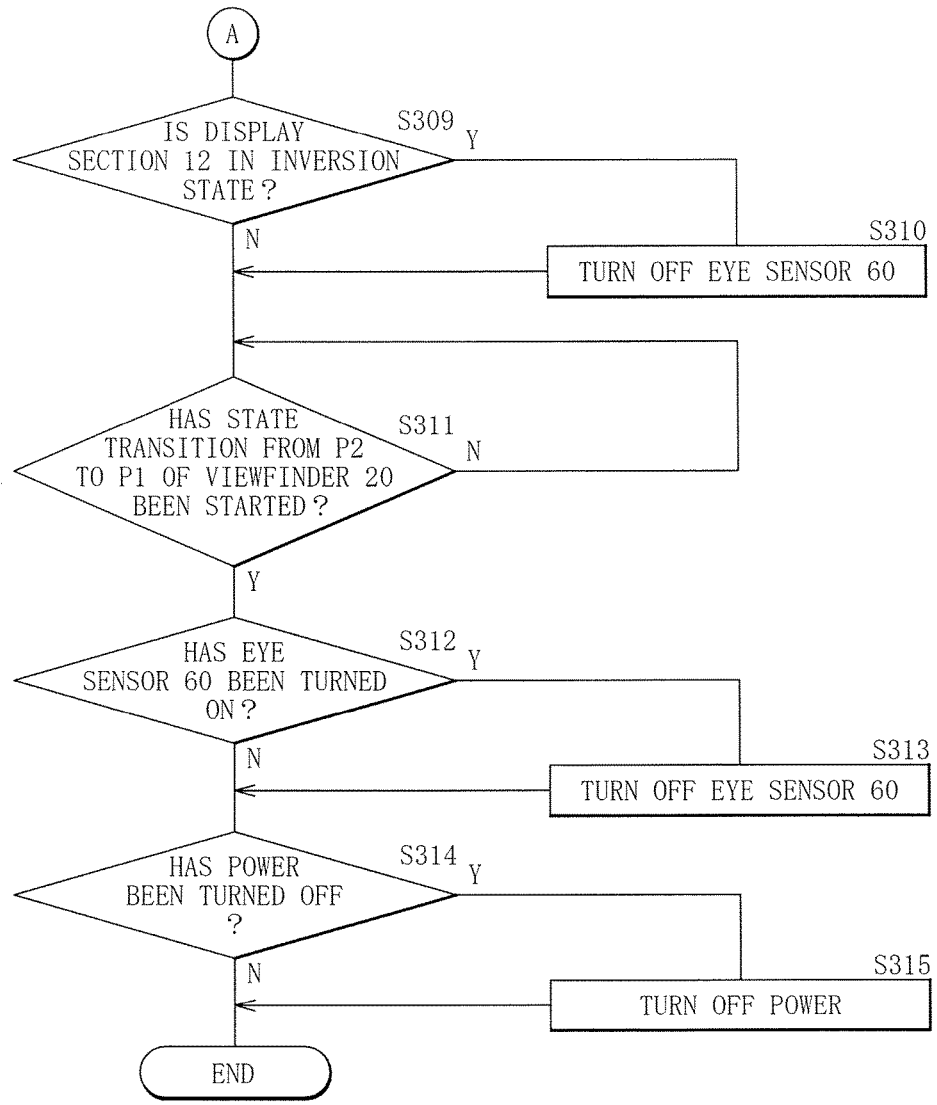
[ FIG. 17B ]

ized when being carried, has been proposed (for example,
IMAGE PICKUP APPARATUS TO PERFORM A PROCESS BASED ON STATE TRANSITION OF VIEWFINDER

CROSS REFERENCE TO RELATED APPLICATIONS

This application is a U.S. National Phase of International Patent Application No. PCT/JP2015/001997 filed on Apr. 9, 2015, which claims priority benefit of Japanese Patent Application No. JP 2014-097046 filed in the Japan Patent Office on May 8, 2014 and Japanese Patent Application No. JP 2014-101709 filed in the Japan Patent Office on May 15, 2014. Each of the above-referenced applications is hereby incorporated herein by reference in its entirety.

TECHNICAL FIELD

The present disclosure relates to an image pickup apparatus provided with a viewfinder.

BACKGROUND ART

In related art, an image pickup apparatus having a viewfinder that is foldable along a main body or is capable of being housed in the main body in consideration of downsizing when being carried, has been proposed (for example, see PTL1 or PTL2). A user draws the viewfinder to a front side and uses the viewfinder.

CITATION LIST

Patent Literature

[PTL1]
JP-A-Sho 60-121431
[PTL2]
JP-A-2001-268402

SUMMARY

Technical Problem

However, recently, improvement of operability together with further downsizing of the entire configuration is desired.

It is desirable to provide an image pickup apparatus excellent in operability.

Solution to Problem

According to an embodiment of the disclosure, there is provided an image pickup apparatus including: a main body provided with an image pickup section; a viewfinder having a main body part and a movable part, the viewfinder being capable of performing state transition in which the movable part moves in a first direction with respect to the main body part to reach a usage state; and a control section configured to perform processing based on the state transition.

In the image pickup apparatus according to the embodiment of the disclosure, the control section performs predetermined processing based on the state transition of the viewfinder. Therefore, the user is allowed to instantly recognize whether the viewfinder is in an appropriate usage state.

Advantageous Effects of Invention

According to the image pickup apparatus of the embodiment of the disclosure, the operability is improved and smooth shooting by the user becomes possible. Incidentally, effects of the disclosure are not limited thereto, and effects achieved by the technology may be one or more of effects described below.

It is to be understood that both the foregoing general description and the following detailed description are exemplary, and are provided to provide further explanation of the technology as claimed.

BRIEF DESCRIPTION OF DRAWINGS

The accompanying drawings are included to provide a further understanding of the technology, and are incorporated in and constitute a part of this specification. The drawings illustrate embodiments and, together with the specification, serve to explain the principles of the technology.

FIG. 1 is a perspective view illustrating an appearance of an image pickup apparatus according to an embodiment of the disclosure.

FIG. 2 is another perspective view illustrating the appearance of the image pickup apparatus illustrated in FIG. 1.

FIG. 3 is a front view illustrating the image pickup apparatus illustrated in FIG. 1.

FIG. 4 is a perspective view illustrating a state in which a viewfinder projects upward from a main body in the image pickup apparatus illustrated in FIG. 1.

FIG. 5 is another perspective view illustrating the state in which the viewfinder projects upward from the main body in the image pickup apparatus illustrated in FIG. 1.

FIG. 6 is a perspective view illustrating the viewfinder of the image pickup apparatus illustrated in FIG. 1, in a usage state.

FIG. 7 is another perspective view illustrating the viewfinder of the image pickup apparatus illustrated in FIG. 1, in the usage state.

FIG. 8 is a perspective view illustrating a configuration of the viewfinder of the image pickup apparatus illustrated in FIG. 1, in a housed state.

FIG. 9 is a perspective view illustrating a configuration of the viewfinder of the image pickup apparatus illustrated in FIG. 1, in the usage state.

FIG. 10A is a front view and a side view each illustrating a configuration of a viewfinder unit illustrated in FIG. 8, in the housed state.

FIG. 10B is a side view illustrating a configuration of the viewfinder unit illustrated in FIG. 8, in the usage state.

FIG. 11A is a side view illustrating a schematic configuration of a viewfinder as a modification of the image pickup apparatus illustrated in FIG. 1, in the housed state.

FIG. 11B is a side view illustrating a schematic configuration of the viewfinder illustrated in FIG. 11A, in the usage state.

FIG. 12 is a perspective view illustrating a state in which a display surface of a display section faces an object side, in the image pickup apparatus illustrated in FIG. 1.

FIG. 13A is a perspective view illustrating a main part of the image pickup apparatus illustrated in FIG. 1, in an enlarged manner.

FIG. 13B is a sectional diagram illustrating a sectional surface including an eye sensor illustrated in FIG. 13A, in an enlarged manner.

FIG. 14 is a block diagram illustrating a schematic configuration of the image pickup apparatus illustrated in FIG. 1.

FIG. 15 is a flowchart illustrating processes executed in the image pickup apparatus according to a first embodiment.

FIG. 16A is a flowchart illustrating processes executed in an image pickup apparatus according to a second embodiment.

FIG. 16B is a flowchart illustrating a part of the processes illustrated in FIG. 16A in detail.

FIG. 16C is a modification of the flowchart illustrated in FIG. 16A.

FIG. 17A is a flowchart illustrating processes executed in an image pickup apparatus according to a third embodiment.

FIG. 17B is a flowchart illustrating processes following the processes of the FIG. 17A.

DESCRIPTION OF EMBODIMENTS

Hereinafter, embodiments of the disclosure will be described in detail with reference to drawings. Note that the description will be given in the following order.
1. First embodiment (an image pickup apparatus in which power-on or power-off operation is performed according to state transition of a viewfinder)
2. Second embodiment (an image pickup apparatus in which display operation and the like of a display section are performed according to state transition of a viewfinder)
3. Third embodiment (an image pickup apparatus in which an eye sensor is turned on or off according to state transition of a viewfinder)

First Embodiment

1. Configuration of Image Pickup Apparatus 1

A basic configuration of an image pickup apparatus 1 according to a first embodiment of the disclosure will be described with reference to FIG. 1 to FIG. 3. FIG. 1 illustrates an appearance configuration of the image pickup apparatus 1 according to the first embodiment of the disclosure as viewed from a front side thereof. FIG. 2 illustrates an appearance configuration of the image pickup apparatus 1 as viewed from a back side thereof. FIG. 3 is a front view illustrating the image pickup apparatus 1 illustrated in FIG. 1.

The image pickup apparatus 1 is a small digital single-lens reflex camera, and for example, may include a main body 10, a viewfinder 20, and an image pickup lens unit 30. The viewfinder 20 is capable of performing state transition between a housed state P1 in which the viewfinder 20 is housed in the main body 10 (FIG. 3) and a usage state P3 in which the viewfinder 20 projects (is exposed) to the outside from the main body 10 (described later). Incidentally, in FIG. 3, the viewfinder 20 in the housed state P1 is illustrated by a dashed line, and the viewfinder 20 in a popup state P2 on a way from the housed state P1 to the usage state P3 is illustrated by a solid line. The viewfinder 20 will be described in detail later. In the image pickup apparatus 1, a mode in which one or both of power-on operation and power-off operation are performed according to the state transition of the viewfinder 20 is selected by a control section 6 described later.

In the following description, a lens side (an object side) is referred to as a front side, and a display section side (an image side) is referred to as a back side in a front-back direction Z of the main body 10. Note that the front-back direction Z is the same as an optical axis direction of a lens (not illustrated) connected to the main body 10. In addition, a right-left direction of the main body 10 is referred to as an X direction, and right and left are indicated in a state of facing a front side from the back side of the main body 10. A vertical direction of the main body 10 is referred to as a Y direction.

The main body 10 may have, for example, a rectangular parallelepiped shape, a body mount 11 is provided on a front surface 10A, and an image pickup device 2A, an image signal processing section 3 (both described later), and the like are housed in the inside of the main body 10. A display section 12 is provided on a back surface 10B of the main body 10.

The body mount 11 mechanically or electrically connects the main body 10 to the replaceable image pickup lens unit 30, and a user may select a lens for a purpose and the selected lens is connectable to the main body 10. The image pickup lens unit 30 has a lens barrel 30B that contains one or more lenses 30A, and lens rings 30C and 30D that are provided around the lens barrel 30B. The lens rings 30C and 30D are mechanical keys used to perform, for example, manual setting of an aperture, a shutter speed, a shooting mode, and the like, or manual operation of focusing or zooming, and configure a part of an input section 8 (described later). Note that the number of lens rings is not particularly limited. The lens rings may not be provided.

The image pickup device 2A configures an image pickup section 2 (described later) together with the image pickup lens unit 30 and the like, and form an image of the object on a light receiving surface through the image pickup lens unit 30 to generate an electric signal by photoelectric conversion. As the image pickup device 2A, a charge coupled device (CCD) image sensor, a complementary metal oxide semiconductor (CMOS) image sensor, or the like is used.

The display section 12 displays a through image under image pickup obtained through the image pickup lens unit 30, an image recorded in a memory medium 7A (described later) in the main body 10 or the like, or various information such as a remaining amount of the battery and shooting conditions, on a display surface 12A. Examples of the shooting conditions may include a shutter speed, an aperture, an f-number, a levelness, and presence or absence of flash. In addition, the display section 12 may have a touch panel section (not illustrated), and may display operation images such as a user interface image, thereby functioning as a touch panel. The display section 12 may be configured of, for example, a liquid crystal panel (LCD), and an organic electro luminescence (EL) panel. As will be described later, the display section 12 may be rotatably connected to the main body 10. Further, the display operation of the display section 12 may be started or ended by the control section 6, for example, according to the state transition of the viewfinder 20.

The viewfinder 20 is used to visually confirm an image to be picked up to perform composition setting, adjustment of focus, and the like, and may be configured of, for example, an optical view finder (OVF) or an electronic view finder (EVF). In the case of the electronic view finder, the viewfinder 20 may have, for example, an eyepiece (not illustrated) and a display screen (not illustrated) such as a liquid crystal panel and an organic EL panel, in the depth of a peep window 21 (not illustrated in FIG. 1 to FIG. 3, see FIG. 7 described later). On the display screen of the viewfinder 20, various information such as a remaining amount of the battery and shooting conditions (for example, a shutter speed, an aperture, an f-number, a levelness, presence or absence of flash) are displayed, in addition to the through image under image pickup. On the display screen of the viewfinder 20, information same as or different from those displayed on the display section 12 may be displayed. On the display screen of the viewfinder 20, for example, only a part of the plurality of pieces of information displayed on the display section 12 may be displayed by the control section 6. Further, the display operation of the viewfinder 20 or the like may be activated by the control section 6, for example, according to the state transition of the viewfinder 20.

The configuration of the viewfinder 20 is further described with reference to FIG. 4 to FIG. 7 in addition to FIG. 1 to FIG. 3. FIG. 4 is a perspective view illustrating an appearance of the image pickup apparatus 1 in the popup state P2 in which the viewfinder 20 projects upward from the main body 10 as viewed from the front side thereof, and FIG. 5 is a perspective view illustrating an appearance of the image pickup apparatus 1 in that state as viewed from the back side thereof. In addition, FIG. 6 and FIG. 7 are perspective views of the viewfinder 20 in the usage state P3 as viewed from the front side and the back side, respectively. The viewfinder 20 can take three states, the housed state P1, the popup state P2, and the usage state P3. The housed state P1 indicates a state in which the viewfinder 20 is housed in the main body 10, namely, a state in which a user (a photographer) does not use the viewfinder 20. Incidentally, in FIG. 1 to FIG. 3, the state in which the entire viewfinder 20 is completely housed in the inside of the main body 10 is illustrated; however, a part of the viewfinder 20 may be exposed. The popup state P2 indicates a state in which the entire viewfinder 20 largely projects upward from the main body 10. In the popup state P2, many parts of the viewfinder 20 are exposed to the outside from the main body 10 as compared with the housed state P1. In addition, the usage state P3 indicates a state appropriate for use of the viewfinder 20 by a user (a photographer), and indicates a state in which a movable part 222 (described later) that is a part of the viewfinder 20 is moved (advanced) to the back side of a main body part 221 (described later) from the popup state P2. In the usage state P3, an image on the display screen provided in the inside of the viewfinder 20 is clearly recognized by the user without being blurred. As described above, the viewfinder 20 is movable in two or more directions (the vertical direction and the front-back direction) in the state transition between the housed state P1 and the usage state P3 in which the viewfinder 20 projects outside the main body 10. Accordingly, the entire configuration of the image pickup apparatus 1 is downsized.

The viewfinder 20 may elongate above the main body 10 (in a direction of an arrow A1) from the housed state P1 (see FIG. 1 to FIG. 3), for example, as illustrated in FIG. 4 and FIG. 5, and then comes up to the popup state P2. The movable part 222 further advances to the back side of the main body 10 (in a direction of an arrow A2) from the popup state P2 as illustrated in FIG. 6 and FIG. 7, and then the viewfinder 20 comes up to the usage state P3. Elongating the viewfinder 20 above the main body 10 allows the peep window 21 to locate above the main body 10. As a result, the configuration is close to the configuration of a normal digital single-lens reflex camera in which the viewfinder 20 is located above the lens barrel and the display section 12, which makes it possible to improve usability for the user. Moreover, allowing a part of the viewfinder 20 to advance to the back side of the main body 10 makes it possible to reduce clearance from an eye and to enhance shielding property.

As an advancing amount of the viewfinder 20 to the back side of the main body 10, for example, an eyepiece surface 22A of the viewfinder 20 may preferably project backward more than the back surface 10B (the display section 12) of the main body 10. This is because the projection reduces clearance from an eye and the possibility that the nose of the user touches the display section 12 is lowered to improve usability.

The main body 10 may preferably have an opening 13 through which the viewfinder 20 enters and leaves from the main body 10, on a top surface 10C. The opening 13 is provided at a position other than the back surface 10B of the main body 10, which facilitates handling of enlargement of the diameter of the lens barrel and enlargement of the display screen of the display section 12. Incidentally, if the opening 13 is provided on the back surface 10B of the main body 10, it is necessary to increase the size of the main body 10, or if the size of the main body 10 is not changed, the size of the lens barrel is decreased, and therefore, magnification is lowered, brightness becomes dark, and the size of the image pickup device is also decreased. In addition, the size of the display section 12 is also decreased.

Note that the position of the opening 13 illustrated in FIG. 1 to FIG. 3 is a position where, for example, a stroboscope is disposed in a typical digital single-lens reflex camera. In the present embodiment, the position of a stroboscope 14 is changed, and the stroboscope 14 is disposed at a position close to the center rather than the opening 13.

As illustrated in FIG. 3 described above, the viewfinder 20 may be preferably provided at a position not overlapped with the body mount 11. This makes it possible to avoid interference between the viewfinder 20 and the lens barrel. Note that the viewfinder 20 may be overlapped with the display section 12 in a back view.

The detailed configuration of the viewfinder 20 is further described with reference to FIG. 8 to FIGS. 10A and 10B, in addition to FIG. 1 to FIG. 7. FIG. 8 is a perspective view illustrating an appearance of the viewfinder 20 in the housed state P1 illustrated in FIG. 1 to FIG. 3. FIG. 9 is a perspective view illustrating the appearance of the viewfinder 20 in the popup state P2 and the usage state P3 illustrated in FIG. 4 to FIG. 7. FIG. 10A is a front view and a side view each illustrating the configuration of a viewfinder unit 22 illustrated in FIG. 8, in the housed state P1 and the popup state P2. FIG. 10B is a side view illustrating an appearance of the viewfinder unit 22 illustrated in FIG. 8, in the usage state P3.

The viewfinder 20 may include, for example, the viewfinder unit 22, a decorative member 23, a first moving mechanism 24, a second moving mechanism 25 (see FIG. 10A and FIG. 10B), and a visibility adjustment section 26 (see FIG. 6, FIG. 7, and FIG. 9).

The viewfinder unit 22 is a part exposed to the outside of the main body 10 in the popup state P2 and the usage state P3, and may include, for example, the main body part 221 elongating in an upward direction to the main body 10, and the movable part 222 elongating in a backward direction to the main body part 221. The viewfinder unit 22 further includes the above-described peep window 21 (see FIG. 5 and FIG. 7) and an eyepiece lens and a display screen (both not illustrated) that are provided in the depth of the peep window 21.

The decorative member 23 covers the side surfaces and the back surface of the viewfinder unit 22 other than the peep window 21, and trims the appearance of the viewfinder 20 and the image pickup apparatus 1. The decorative member 23 may include, for example, a top surface decorative member 23A and a side surface decorative member 23B. The top surface decorative member 23A configures a part of the exterior member of the top surface 10C of the main body 10 when the viewfinder 20 is in the housed state P1. The side surface decorative member 23B covers the side surfaces and the back surface of the viewfinder unit 22 when the viewfinder 20 is in the popup state P2 and the usage state P3.

The side surface decorative member 23B may preferably have a cutout 23C that avoids the body mount 11. This makes it possible to dispose the viewfinder 20 while avoiding the body mount 11 as illustrated in FIG. 3.

The first moving mechanism 24 lifts up the viewfinder unit 22 above the main body 10, and may be configured of, for example, a mechanical moving mechanism. Specifically, the first moving mechanism 24 includes a base frame 31, a slide frame 32, a first elastic member 33, and a hooking mechanism 34. The base frame 31 and the slide frame 32 have a double cylinder structure in which the slide frame 32 is inserted in the base frame 31. Incidentally, the inside of each of the base frame 31 and the slide frame 32 may be preferably hollowed so as to be capable of housing a battery of the stroboscope 14 and the like.

The base frame 31 may include, for example, a base frame main body 31A made of a metal plate or the like, a projection part 31B, a rotation regulating part 31C, and a pressing part 31D. The base frame main body 31A may be fixed to, for example, the main body 10. Moreover, a first end 33A of the first elastic member 33 is fixed to the base frame main body 31A. Further, a long hole 31E that defines moving range of a second end 33B of the first elastic member 33 is provided in the base frame main body 31A. The projection part 31B is a part holding the hooking mechanism 34, and is configured integrally with the rotation regulating part 31C and the pressing part 31D. The rotation regulating part 31C regulates the rotation range of the hooking mechanism 34, and is provided in a guide groove 34B of the hooking mechanism 34. The pressing member 31D is to suppress detachment of a hook part 34C of the hooking mechanism 34 from a hole 32B of the slide frame 32.

The slide frame 32 may include, for example, a slide frame main body 32A made of a metal plate or the like, and the hole 32B. The slide frame main body 32A is fixed, by a screw 32C (see FIG. 9), to the decorative member 23 that covers the viewfinder unit 22. The hole 32B receives the hook part 34C of the hooking mechanism 34 to hold the viewfinder 20 in the housed state P1.

The first elastic member 33 is provided between the base frame 31 and the slide frame 32, and biases the slide frame 32 upward. The first elastic member 33 may be preferably configured of, for example, a spring. The kind of the spring is not particularly limited, and may be preferably configured of, for example, a tension coil spring or a torsion coil spring. The first end 33A of the first elastic member 33 is fixed to the base frame main body 31A of the base frame 31, and the second end 33B of the first elastic member 33 is fixed to the slide frame main body 32A of the slide frame 32.

The hooking mechanism 34 regulates upward movement of the slide frame 32, and may include, for example, an attachment part 34A, the guide groove 34B, the hook part 34C, and a receiving part 34D. The attachment part 34A is rotatably attached to the projection part 31B of the base frame 31. The guide groove 34B defines the rotation range of the hooking mechanism 34. The rotation regulating part 31C of the base frame 31 is provided in the guide groove 34B. The hook part 34C extends downward from one point of the attachment part 34A. The hook part 34C is engaged with the hole 32B of the slide frame 32, which allows the viewfinder 20 to be held in the housed state P1. The receiving part 34D is a part holding a viewfinder operation section (a button) 10E provided on the side surface 10D of the main body 10. When the viewfinder 20 is not used, the viewfinder operation section 10E is held by the receiving part 34D, which regulates rotation of the attachment part 34A, and therefore a state where the hook part 34C is engaged with the hole 32B of the slide frame 32 is maintained. When the viewfinder 20 is used, the user slides the viewfinder operation section 10E so that the viewfinder operation section 10E is unlocked from the receiving part 34D, and therefore the attachment part 34A rotates and the hook part 34C is detached from the hole 32B of the slide frame 32.

The second moving mechanism 25 advances the movable part 222 of the viewfinder unit 22 to the backside of the main body 10, and may be configured of, for example, a mechanical moving mechanism. Specifically, as illustrated in FIG. 10 and FIG. 11, the second moving mechanism 25 has a second elastic member 41. The second elastic member 41 is provided between the viewfinder unit 22 and the decorative member 23, and biases the viewfinder unit 22 backward (in the Z direction). The second elastic member 41 may be preferably configured of, for example, a spring. The kind of the spring is not particularly limited, and may be preferably configured of, for example, a deformed compression shaped spring. A first end 41A of the second elastic member 41 is fixed to the back surface of the viewfinder unit 22, and a second end 41B of the second elastic member 41 is fixed to the decorative member 23. When the viewfinder unit 22 is not used, preferably, the viewfinder unit 22 may be pressed by the back surface 10B of the main body 10 and movement by the biasing force of the second elastic member 41 may be suppressed.

Note that the second moving mechanism 25, namely, the second elastic member 41 may be omitted, and the user may draw the movable part 222 of the viewfinder unit 22 backward by hand.

Moreover, in the above description, operation of elongating the viewfinder 20 above the main body 10 is performed with use of the first moving mechanism 24 that is a mechanical moving mechanism. However, as with an image pickup apparatus 1A as a modification illustrated in FIG. 11A and FIG. 11B, an electric moving mechanism 27 may be used in place of the first moving mechanism 24.

The image pickup apparatus 1A may include, for example, the viewfinder unit 22 and the electric moving mechanism 27. The electric moving mechanism 27 lifts up the viewfinder unit 22 above the main body 10, and may include, for example, a base frame 51, a slide frame 52, a rack 53, and a motor 54. The base frame 51 and the slide frame 52 have a double cylinder structure in which the slide frame 52 is inserted in the base frame 51. Incidentally, the inside of each of the base frame 51 and the slide frame 52 may be preferably hollowed so as to be capable of housing the battery of the stroboscope 14 and the like. The rack 53 is provided on the slide frame 52. The motor 54 is fixed to the base frame 51, and has a worm gear 54A that is engaged with the rack 53.

When being not used, the viewfinder 20 is in the housed state P1 in the main body 10 (see FIG. 1 to FIG. 3). When the viewfinder 20 is used, the user operates the viewfinder operation section (not illustrated) that is provided on the main body 10, and thus the motor 54 rotates. The worm gear 54A attached to a rotary shaft of the motor 54 and the rack 53 are engaged to allow the rack 53 to slide (see FIG. 11B). Accordingly, the slide frame 52 moves above the main body 10, and the viewfinder unit 22 pops up to the outside of the main body 10 (see FIG. 4 and FIG. 5). The raised slide frame 52 and the raised viewfinder unit 22 are held at a popup position by self-locking of the worm gear 54A, and the popup state P2 is maintained.

In the popup state P2, backward movement of the movable part 222 caused by the biasing force of the second elastic member 41 is suppressed by the back surface 10B of the exterior member of the main body 10 (see FIG. 11A). However, when the viewfinder unit 22 advances to the outside of the main body 10, the movable part 222 advances to the backside of the main body 10 by the biasing force of the second elastic member 41, and the viewfinder unit 22 is put into the usage state P3 (see FIG. 11B). In this way, the viewfinder 20 is allowed to be put into the usage state P3 from the housed state P1 fully automatically.

The visibility adjustment section 26 is an operation section (a lever, a knob, a dial, etc.) to adjust degree of the viewfinder 20 so as to be fitted to eyesight of the user. For example, the visibility adjustment section 26 may be provided on a top surface of the viewfinder unit 22 of the viewfinder 20. In addition, the visibility adjustment section 26 is covered with the top surface decorative member 23A of the decorative member 23, in the housed state P1 and the popup state P2 (see FIG. 1 to FIG. 3). In contrast, in the usage state P3, the visibility adjustment section 26 is exposed to the outside from the top surface decorative member 23A of the decorative member 23, thereby becoming operable (see FIG. 6 and FIG. 7). In this way, restricting access to the visibility adjustment section 26 makes it possible to avoid that the visibility adjustment section 26 is unintentionally operated and the setting is accordingly changed. In addition, projection amount of the visibility adjustment section 26 from the top surface of the viewfinder unit 22 is reduced, and the possibility that the setting is reset even when the viewfinder 20 is returned to the popup state P2 or the housed state P1 from the usage state P3 is also reduced. Therefore, complexity of readjustment of the visibility adjustment section 26 at every time of use is eliminated, which makes it possible to enhance usability of the user. Note that the visibility adjustment section 26 is not limited to the mechanical operation section, and may be an electronic operation section. In this case, for example, data for visibility adjustment according to the user may be stored in a memory section (not illustrated) in the control section 6. For example, such data for visibility adjustment may be stored when a release button 16 (described later) is pressed down at the time of shooting operation.

As described above, the display section 12 is rotatably provided with respect to the main body 10, and the display surface 12A thereof may be directed to the front side (see FIG. 12). The state illustrated in FIG. 12 corresponds to a self-shooting mode in which the user picks up an image of the user himself as an object.

A power button 15, the release button 16, and a mode setting dial 17 that configure a part of the input section 8 are further provided on the top surface 10C of the main body 10. The power button 15 performs power-on operation and power-off operation of the entire image pickup apparatus 1. The release button 16 is used to perform shooting operation, and is a two-stage detection button capable of detecting two states, for example, a half-pressed state and a full-pressed state. When the release button 16 is put into the half-pressed state, preparation operation to acquire a recording-use image (main captured image) relating to an object is performed. The preparation operation here may indicate, for example, automatic focus (AF) control operation, automatic exposure (AE) control operation, and the like. In addition, when the release button 16 is further pressed down and is put into the full-pressed state, the shooting operation of the main captured image is performed. The shooting operation indicates a series of operation in which exposure operation relating to the object is performed with use of the image pickup device 2A and predetermined image processing is performed on an image signal obtained by the exposure operation. Further, the mode setting dial 17 performs setting operation of various kinds of operation modes of the image pickup apparatus 1. Examples of the operation mode of the image pickup apparatus 1 may include a shooting mode, a play mode playing captured images, and a communication mode performing data communication with external devices.

The image pickup apparatus 1 may include, for example, an eye sensor 60 in the vicinity of the viewfinder 20, on the back surface 10B of the main body 10. The eye sensor 60 may detect whether the user (a photographer) looks into the viewfinder 20 by, for example, a magnetic sensor, and switches over the display on the display section 12 and the display of the viewfinder 20. For example, when the eye sensor 60 detects approach of an eye of the user, an image is not displayed on the display surface 12A of the display section 12. This is because, if the image is still displayed on the display screen 12A, image light from the display surface 12A enters the eye of the user looking in the peep window 21 of the viewfinder 20, which impedes visual confirmation of the display screen in the viewfinder 20.

Note that the image pickup apparatus 1 may include an eye sensor 60A in the vicinity of the peep window 21 of the viewfinder 20 in the usage state P3, for example, as illustrated in FIGS. 13A, and 13B, in place of the eye sensor 60. FIG. 13A is a perspective view illustrating the vicinity of the peep window 21 of the image pickup apparatus 1 in an enlarged manner, and FIG. 13B illustrates a sectional configuration of the eye sensor 60A. The eye sensor 60A may include, for example, a sensor window 61, a sensor device 62, and a reflection member 63. The sensor device 62 is provided perpendicularly to the sensor window 61. The reflection member 63 is provided on an optical path LP between the sensor window 61 and the sensor device 62. Accordingly, it is possible to achieve downsizing of the image pickup apparatus 1. For example, the sensor window 61 may be provided on the eyepiece surface 22A of the viewfinder 20 (for example, in a region around the peep window 21, lower left in FIG. 13A). Providing the eye sensor 60A in the viewfinder 20 in this way makes it possible to provide the eye sensor 60A at a position close to eyes and to enhance detection accuracy. In addition, in the housed state P1, the eye sensor 60A is hidden in the main body 10, and therefore, the possibility of malfunction is decreased.

The sensor device 62 may include, for example, a photodetector 62B on a substrate 62A, and may be mounted on a supporting member 64. The photodetector 62B detects variation of light amount of the incident light that has passed through the sensor window 61, which detects presence of approach of an eye of the user.

The reflection member 63 has a reflection surface 63A that reflects light by a mirror surface, and thus changes the traveling path of the light. As illustrated in FIG. 13B, the reflection member 63 may be provided as a member integral with the sensor window 61, or may be provided as a member separated from the sensor window 61.

FIG. 14 is a block diagram illustrating an entire configuration of the image pickup apparatus 1. The image pickup apparatus 1 includes an image pickup section 2, an image signal processing section 3, an encoding-decoding section 4, an image memory 5, a control section 6, a speaker 6A, a motor 6B, a recording-reproducing section 7, an input section 8, and detection sections 9A and 9B, in addition to the display section 12 and the viewfinder 20. The image pickup lens unit 30 is included in the image pickup section 2.

The image pickup section 2 is a mechanism acquiring picked-up image data. The image pickup section 2 may include, for example, the image pickup device 2A, a preprocessing section 2B, a timing generator 2C, a driving section 2D, and the like, in addition to the image pickup lens unit 30. The image pickup device 2A is driven based on a timing signal output from the timing generator 2C, photoelectrically converts incident light from an object into a charge amount, and outputs the charge amount as an analog image pickup signal. The analog image pickup signal output from the image pickup device 2A is output to the preprocessing section 2B. The preprocessing section 2B includes a sample and hold/automatic gain control (AGC) circuit that performs gain control and waveform shaping on the analog image pickup signal obtained by the image pickup device 2A, a video A/D converter, and the like. The timing generator 2C outputs the timing signal to the image pickup device 2A, according to an instruction of the control section 6. In addition, the driving section 2D performs focusing, zooming, shutter speed adjustment, diaphragm adjustment, and the like of the image pickup lens unit 30, based on control by the control section 6.

The image signal processing section 3 performs various kinds of image signal processing such as gradation correction processing, shading correction processing, high band correction (contour correction) processing, and image stabilization processing, on the picked-up image data obtained by the image pickup section 2.

The encoding-decoding section 4 performs compression processing of the picked-up image data that is subjected to the image signal processing by the image signal processing section 3, and expansion processing of the compressed picked-up image data. As for a still image, compression processing and expansion processing of a predetermined still image format such as joint photographic experts group (JPEG) format are performed. On the other hand, as for a moving picture, compression processing and expansion processing of a predetermined moving picture format such as moving picture experts group (MPEG) format are performed.

The image memory 5 may be a buffer memory configured of a volatile memory such as a dynamic random access memory (DRAM), and temporarily stores therein the image data subjected to the predetermined processing by the preprocessing section 2B, the image signal processing section 3, and the encoding-decoding section 4.

The control section 6 may be configured of, for example, a central processing unit (CPU), a random access memory (RAM), and a read-only memory (ROM). Programs to be read and operated by the CPU, etc. are stored in the ROM. The RAM is used as a work memory of the CPU. The CPU executes various processing according to the programs stored in the ROM and issues commands to control the entire image pickup apparatus 1.

The recording-reproducing section 7 may include a recording medium 7A, for example, a semiconductor memory such as a flash memory, or a magnetic disk, an optical disk, or a magneto-optical disk, and a media drive 7B. The media drive 7B performs recording of the compressed picked-up image data of a still image format or a moving picture format that is obtained by the encoding-decoding section 4, in the recording medium 7A, and reproducing (reading out) of various kinds of data of the compressed picked-up image data stored in the recording medium 7A.

The input section 8 is a section in which the user performs various kinds of operation input to the image pickup apparatus 1, and may include, for example, a touch panel section included in the display section 12, the power button 15, the release button 16, and the mode setting dial 17 that are provided on the main body 10, lens rings 30C and 30D provided in the image pickup lens unit 30, etc. The input section 8 detects the input operation of the user, and transmits information corresponding to the input operation (operation input information) to the control section 6.

The detection section 9A has a sensor detecting rotation of the display section 12, and detects whether the display section 12 is in the normal shooting state illustrated in FIG. 1 to FIG. 7 or in the inversion state illustrated in FIG. 12. In other words, the detection section 9A detects whether the display section 12 is in a first rotation state (the normal shooting state in which the display surface 12A directs backward) or in a second rotation state (the inversion state in which the display surface 12A directs frontward). On the other hand, the detection section 9B detects the current state of the viewfinder 20 between the housed state P1 and the usage state P3. As for the detection sections 9A and 9B, a sensor using a mechanical method, an electromagnetic method, or an optical method is applied. When it is determined by the detection section 9A that the display section 12 is in the self-shooting mode (located at the inverted position), the control section 6 selects mode of performing the operation stop of the eye sensor 60.

2. Image Pickup Operation by Image Pickup Apparatus 1

The image pickup apparatus 1 may operate as illustrated in FIG. 15, for example. FIG. 15 is a first flowchart illustrating a flow of a series of operation from activation to stop of the image pickup apparatus 1. In the image pickup apparatus 1, the mode to perform one or both of the power-on operation and the power-off operation is selectable by the control section 6, according to the state transition of the viewfinder 20. For example, the control section 6 performs the power-on operation when the viewfinder 20 transits from the housed state P1 to the usage state P3, or the control section 6 performs the power-off operation when the viewfinder 20 transits from the usage state P3 to the housed state P1. Note that the processing illustrated in FIG. 15 is executed by the control section 6, for example, according to the programs stored in the ROM and the like.

When being not used, the viewfinder 20 is in the housed state P1 in the main body 10 (see FIG. 1 to FIG. 3). At this time, the viewfinder operation section 10E is held by the receiving part 34D of the hooking mechanism 34 so that the rotation of the attachment part 34A of the hooking mechanism 34 is regulated, and the state where the hook part 34C of the hooking mechanism 34 is engaged with the hole 32B of the slide frame 32 is maintained (see FIG. 8).

To perform the shooting operation of the image pickup apparatus 1, first, the popup operation for the viewfinder 20 that is state transition from the housed state P1 in which the viewfinder 20 is housed in the main body 10, to the popup state P2 is started. In other words, the viewfinder operation section 10E is slid to allow the viewfinder unit 22 to pop up from the main body 10. More specifically, when the viewfinder operation section 10E is slid, the viewfinder operation section 10E is unlocked from the receiving part 34D of the hooking mechanism 34, and the attachment part 34A of the hooking mechanism 34 rotates. Accordingly, the hook part 34C of the hooking mechanism 34 is released from the hole 32B of the slide frame 32 (see FIG. 9). As a result, the slide frame 32 moves above the main body 10 by the biasing force of the first elastic member 33, and the viewfinder unit 22 pops up to the outside of the main body 10 (see FIG. 4 and FIG. 5). Here, the detection section 9B determines whether the state transition from the housed state P1 to the popup state P2 has been started, namely, whether the viewfinder 20 has started to move toward the popup state P2 from the housed state P1 (step S101). When it is detected that the state transition from the housed state P1 to the popup state P2 has been started, it is determined whether the power has been turned on (step S102). When it is not detected that the state transition from the housed state P1 to the popup state P2 has been started, the process at the step S101 is performed again.

At the step S102, when it is determined that the power has been already turned on by the power button 15, the display screen of the viewfinder 20 is activated (step S103), and predetermined information and a through-image are displayed. At this time, the viewfinder 20 is transited from the popup state P2 to the usage state P3 as well. Here, the movable part 222 of the viewfinder unit 22 may be advanced to the backside of the main body 10 with use of the second moving mechanism 25, or the movable part 222 may be drawn backward by hand. In other words, the state transition from the housed state P1 to the usage state P3 may be fully automatically performed with use of both of the first moving mechanism 24 and the second moving mechanism 25, or the state transition may be partially performed manually without using the second moving mechanism 25. When it is determined that the power has not been turned on at the step S102, the power is turned on (step S104), and the process at the step S103 is further performed. Incidentally, at the time of the power-on operation by the power button 15, the control section 6 may preferably perform the display operation of only the display section 12 when the viewfinder 20 is in the housed state P1 or the popup state P2. On the other hand, at the time of the power-on operation by the power button 15, the control section 6 may perform the display operation of both of the display section 12 and the display screen of the viewfinder 20 when the viewfinder 20 is in the usage state P3. At this time, for example, only a part of the plurality of pieces of information displayed on the display section 12 may be displayed on the display screen of the viewfinder 20, by the control section 6.

After that, the control section 6 selects the shooting mode, or instructs to perform the shooting mode (step S105). The shooting modes may be largely classified into, for example, a self-shooting mode and a normal shooting mode, and each of the modes includes a still image shooting mode and a moving picture shooting mode.

Subsequently, after the viewfinder 20 is transited from the usage state P3 to the popup state P2, the state transition from the popup state P2 to the housed state P1 is further started. Specifically, the movable part 222 of the viewfinder unit 22 is pressed forward so as to be hidden by the decorative member 23, and then the viewfinder unit 22 and the decorative member 23 are pressed downward so as to be housed in the main body 10. At the time of the state transition from the usage state P3 to the housed state P1, the function of the display operation of the viewfinder 20 and the like may be ended by the control section 6. At this time, the detection section 9B determines, for example, whether the state transition from the popup state P2 to the housed state P2 has been started, namely, whether the viewfinder 20 has started to move toward the housed state P1 from the popup state P2 (step S106). When the start of the state transition from the popup state P2 to the storage state P1 is detected, it is determined whether the power has been turned off (step S107). When the start of the state transition from the popup state P2 to the housed state P1 is not detected, the process at the step S106 is performed again.

When it is determined that the power has been turned off by the power button 15 at the step S107, the series of operation is ended as is. When it is determined that the power has not been turned off, the power is turned off and thus the series of operation is ended (step S108). Incidentally, the control section 6 may continue the shooting mode without turning off the power or may perform transition to a power saving mode (a sleep mode) after allowing the viewfinder 20 to transit from the usage state P3 to the housed state P1.

In FIG. 15, the control section 6 turns on the power with the transition start from the housed state P1 to the popup state P2 as a trigger, and turns off the power with the transition start from the popup state P2 to the housed state P1 as a trigger. However, it may be performed in the following manner in the present technology. For example, the power may be turned on with detection of any of the following (1) to (3) as a trigger.

(1) completion of the transition from the housed state P1 to the popup state P2, that is, arrival of the viewfinder 20 to the popup state P2 after movement from the housed state P1

(2) start of the transition from the popup state P2 to the usage state P3, that is, movement start of the movable part 222 of the viewfinder unit 22 to the backside of the main body part 221

(3) completion of the transition from the popup state P2 to the usage state P3, that is, completion of the movement of the movable part 222 of the viewfinder unit 22 to the backside of the main body part 221 and arrival of the viewfinder 20 to the usage state P3 Likewise, the power may be turned off with detection of any of the following (4) to (6) as a trigger.

(4) completion of the transition from the popup state P2 to the housed state P1, that is, arrival of the viewfinder 20 to the housed state P1 after movement from the popup state P2

(5) start of the transition from the usage state P3 to the popup state P2, that is, start of forward movement of the movable part 222 of the viewfinder unit 22 toward the main body part 221

(6) completion of the transition from the usage state P3 to the popup state P2, that is, completion of the forward movement of the movable part 222 of the viewfinder unit 22 toward the main body part 221, and arrival of the viewfinder 20 to the popup state P2

3. Function and Effects of Image Pickup Apparatus 1

As described above, in the image pickup apparatus 1, the power-on operation and the power-off operation are performed by the control section 6, according to the state transition of the viewfinder 20. Therefore, it is unnecessary for the user to perform the power-on operation and the power-off operation afresh through, for example, the operation of the power button 15. Consequently, according to the image pickup apparatus 1, the operability is improved, and smooth shooting by the user becomes possible.

Further, in the image pickup apparatus 1, the viewfinder 20 is movable in two or more directions between the housed state P1 in which the viewfinder 20 is housed in the main body 10 and the usage state P3 in which the viewfinder 20 projects outside the main body 10. Therefore, it becomes possible to provide the opening 13 through which the viewfinder 20 enters and leaves from the main body 10, other than the back surface 10B of the main body 10, and it becomes possible to downsize the main body 10 while addressing increase in diameter of the lens barrel and increase in size of the screen of the display section 12.

Second Embodiment

At the time when the shooting operation of the image pickup apparatus 1 is performed, the control section 6 may perform various kinds of output operation according to the state transition of the movable part 222 of the viewfinder unit 22. Specifically, the image pickup apparatus 1 may operate in a manner, for example, as illustrated in FIGS. 16A and 16B. FIG. 16A is a second flowchart illustrating a flow of a series of operation from activation to stop of the image pickup apparatus 1. FIG. 16B is a flowchart illustrating a part of processes (step S203) of FIG. 16A in more detail. In the image pickup apparatus 1, a mode to perform various kinds of output operation according to the state transition of the movable part 222 of the viewfinder unit 22 is allowed to be selected by the control section 6. The various kinds of output operation used here may include, for example, an alert display, generation of alert sound, and alert vibration. Configurations other than described above are substantially similar to those in the above-described first embodiment, and thus description thereof will be omitted. Incidentally, the processes illustrated in FIGS. 16A and 16B are also performed by the control section 6, for example, according to the programs stored in ROM or the like.

To perform the shooting operation of the image pickup apparatus 1, first, the power is turned on by pressing down of the power button 15 (step S201). Alternatively, similarly to the above-described first embodiment, the power may be turned on according to the state transition of the viewfinder 20 between the housed state P1 and the usage state P3. In this case, the control section 6 may turned on the power at an arbitrary timing between the housed state P1 and the usage state P3. Next, the display screen of the viewfinder 20 is activated, and predetermined information and a through image are displayed (step S202). At this time, the display operation of the display section 12 may be started together. Various kinds of information such as a remaining amount of a battery and shooting conditions (for example, a shutter speed, an aperture, an f-number, a levelness, and presence or absence of flash) in addition to the through image under image pickup are displayed on the display screen of the viewfinder 20. More information may be further displayed on the display section 12. In addition, only information by characters, figures, symbols, or the like may be displayed on the display section 12 without displaying the through image under image pickup. Moreover, for example, only part of the plurality of pieces of information displayed on the display section 12 may be displayed on the display screen of the viewfinder 20.

Next, it is determined whether the viewfinder 20 is in the usage state P3 (step S203). Examples of the case where the viewfinder 20 is not in the usage state P3 may include a case where the movable part 222 is not moved to the backside of the main body 221, namely, a case where a drawn operation is not started, and a case where the movable part 222 starts to move to the backside of the main body part 221 but the position of the drawn movable part 222 is not appropriate. Alternatively, it is assumed a case where operation of state transition is stopped during fully-automatic state transition from the housed state P1 to the usage state P3. Specifically, there are a case where the viewfinder 20 may be caught by an inner surface of the opening 13 during the popup operation and stops upward movement, and a case where the movable part 222 drawn from the main body part 221 stops movement due to mechanical friction or the like. In these cases, an image of the display screen provided inside the viewfinder 20 is blurred even if the user can look in the peep window 21.

At the step S203, specifically, processes from step S203A to step S203D illustrated in FIG. 16B are performed. First, it is determined whether the viewfinder 20 has started to move from the housed state P1 to the popup state P2, namely, whether the viewfinder 20 has started the popup operation (step S203A). When it is determined that the popup operation has been started at the step S203A, it is determined whether the viewfinder 20 has reached the popup state P2 (step S203B). On the other hand, when it is determined that the popup operation has not been started at the step S203A, it is considered that, for example, the user forgets to perform the operation of the viewfinder operation section 10E. Alternatively, it is considered that the user appropriately performs operation of the viewfinder operation section 10E but the viewfinder 20 does not move due to any trouble on the mechanism. In any case, the viewfinder 20 is not allowed to be used as it is, and in this case, for example alert display is performed on the display section 12 (step S204), and the process returns to the step S203A again.

When it is determined that the viewfinder 20 has reached the popup state P2 at the step S203B, it is further determined whether the viewfinder 20 has started to move from the popup state P2 to the usage state P3 (step S203C). On the other hand, when it is determined that the viewfinder 20 has not reached the popup state P2 at the step S203B, it is considered that, for example, the user appropriately performs the operation of the viewfinder operation section 10E but the viewfinder 20 does not pop up to an appropriate position due to any trouble on the mechanism. The viewfinder 20 is not allowed to be used as it is, and also in this case, the alert display is performed on the display section 12 (step S204), and the process returns to the step S203A (or the step S203B) again.

When it is determined that the viewfinder 20 has started to move from the popup state P2 to the usage state P3 at the step S203C, it is determined whether the viewfinder 20 has reached the usage state P3 (step S203D). On the other hand, when it is determined that the viewfinder 20 has not started to move from the popup state P2 to the usage state P3 at the step S203C, it is considered that, for example, the user forgets to perform the draw operation of the movable part 222. The display screen inside the viewfinder 20 is recognized indistinctly in this state, and therefore, also in this case, the alert display is performed on the display section 12 (step S204), and the process returns to the step S203A (or the step S203C) again.

When it is determined that the viewfinder 20 has reached the usage state P3 at the step S203D, the process at the step S203 is completed. On the other hand, when it is determined that the viewfinder 20 is not in the usage state P3 at the step S203D, it is considered that, for example, the user starts the draw operation of the movable part 222 but the user does not perform the draw operation to the appropriate position. The display screen inside the viewfinder 20 is recognized indistinctly in this state. Therefore, also in this case, the alert display is performed on the display section 12 (the step S204), and the process returns to the step S203A (or the step S203D) again.

At the step S204, the speaker 6A (FIG. 14) provided on the main body 10 is allowed to generate alert sound, or the motor 6B (FIG. 14) provided on the main body 10 is allowed to perform alert vibration, in addition to the alert display on the display section 12, or together with the alert display on the display section 12. Alternatively, at the step S204, the alert display on the display section 12 is not performed, and one or both of the generation of the alert sound and the alert vibration may be performed.

After the process at the step S203 is completed, the control section 6 selects the operation mode, or instructs execution of the operation mode (step S205). Examples of the shooting modes may include a still image shooting mode and a moving picture shooting mode.

Subsequently, the viewfinder 20 is allowed to transit from the usage state P3 to the housed state P1 in which the viewfinder 20 is housed in the main body 10, through the popup state P2 (step S206). Specifically, the viewfinder unit 22 is pressed forward so as to be hidden by the decorative member 23, and then the viewfinder unit 22 and the decorative member 23 are pressed downward to be housed in the main body 10. At the time of the state transition from the usage state P3 to the housed state P1, the function of the display operation and the like of the viewfinder 20 may be ended by the control section 6.

Next, the control section 6 determines whether the power has been turned off (step S207), and when it is determined that the power has been already turned off by the operation of the power button 15, the series of operation is ended as it is. When it is determined that the power has not been turned off, the power is turned off to end the series of operation (step S208). Note that the control section 6 may continue the shooting mode or may shift the power saving mode (the sleep mode) without turning off the power, after allowing the viewfinder 20 to transit from the usage state P3 to the housed state P1.

In this way, in the second embodiment, the various kinds of output operation are performed by the control section 6, according to the state transition of the viewfinder 20. Therefore, the user is allowed to instantaneously recognize whether the viewfinder 20 is in the appropriate usage state. Consequently, according to the second embodiment, the operability is improved and smooth shooting by the user becomes possible.

Incidentally, although the power is turned on by pressing down of the power button 15, etc. in the second embodiment (step S201), the power may be turned on at the time when the viewfinder 20 transits from the housed state P1 to the usage state P3, similarly to the first embodiment.

Moreover, in the second embodiment, for example, as with a flowchart as a modification illustrated in FIG. 16C, the order of the step S202 and the step S203 may be exchanged. In other words, after the power is turned on (step S201), the usage state P3 of the viewfinder 20 is confirmed (step S203), and then the display screen of the viewfinder 20 may be activated (step S202).

Third Embodiment

To perform the shooting operation of the image pickup apparatus 1, the control section 6 may perform activation and operation stop of the eye sensor 60, according to the state transition of the viewfinder 20. Specifically, the image pickup apparatus 1 may operate in a manner as illustrated in FIGS. 17A and 17B, for example. FIGS. 17A and 17B are third flowcharts illustrating a flow of a series of operation from activation to stop of the image pickup apparatus 1. Configurations other than those described above are substantially similar to those in the above-described first embodiment, and thus description thereof will be omitted. Incidentally, the processes illustrated in FIGS. 17A and 17B are also performed by the control section 6, for example, according to the programs stored in the ROM.

In the third embodiment, the control section 6 selects a mode to perform one or both of turning on and turning off of the eye sensor 60, according to the state transition of the viewfinder unit 22. Further, the control section 6 may change assignment of functions of a plurality of mechanical keys depending on a case where the eye sensor 60 detects that the viewfinder 20 is used by the user and other cases. Here, the case where the eye sensor 60 detects that the viewfinder 20 is used by the user indicates a case where it is detected that the eye of the user approaches the peep window 21 of the viewfinder 20. In addition, change of the assignment of functions of the plurality of mechanical keys indicates that, for example, the functions of the lens rings 30C and 30D provided around the lens barrel 30B are changed depending on whether the user looks in the peep window 21 of the viewfinder 20. More specifically, for example, when the user does not look in the peep window 21, the lens ring 30C may be allowed to function as an operation section used to perform setting of the shutter speed, and when the user looks in the peep window 21, the lens ring 30C may be allowed to function as an operation section used to perform focusing. Note that the embodiment of the assignment of functions of the plurality of mechanical keys is not limited thereto.

To perform the shooting operation of the image pickup apparatus 1, first, the state transition of the viewfinder 20 from the housed state P1 in which the viewfinder 20 is housed in the main body 10 to the popup state P2 is started. In other words, the viewfinder operation section 10E is slid to allow the viewfinder unit 22 to pop up from the main body 10. Here, the detection section 9B determines whether the state transition from the housed state P1 to the popup state P2 has been started, namely, whether the viewfinder unit 20 has started to move from the housed state P1 to the popup state P2 (step S301). When the start of the state transition from the housed state P1 to the popup state P2 is detected, it is determined whether the power has been turned on (step S302). When the start of the state transition from the housed state P1 to the popup state P2 is not detected, the process at the step S301 is performed again.

When it is determined that the power has been already turned on by the power button 15 at the step S302, the display screen of the viewfinder 20 is activated (step S303), and predetermined information and a through image are displayed. At this time, the viewfinder 20 is transited from the popup state P2 to the usage state P3 together. When it is determined that the power has not been turned on at the step S302, the power is turned on (step S304), and further the process at the step S303 is performed. Note that, at the time when the power is turned on by the power button 15, the control section 6 may preferably perform display operation of only the display section 12 when the viewfinder 20 is not in the usage state P3. Moreover, the power may be automatically turned on at the time of transiting from the housed state P1 to the usage state P3 of the viewfinder 20 (at any timing between the housed state P1 and the usage state P3). Furthermore, for example, only a part of the plurality of pieces of information displayed on the display section 12 may be displayed on the display screen of the viewfinder 20.

Subsequently, the control section 6 turns on the eye sensor 60 (step S305), and then determines whether the user looks in the peep window 21 with use of the eye sensor 60 (step S306). When it is determined that the user looks in the peep window 21, the display of the display surface 12A of the display section 12 is turned off (step S307). After that, the control section 6 selects the shooting mode or instructs the execution of the shooting mode (step S308). Then, the detection section 9A detects whether the display section 12 is in the first rotation state (in the normal shooting state) illustrated in FIG. 1 to FIG. 7 or in the second rotation state (in the inversion state) illustrated in FIG. 12 (step S309). When it is determined that the display section 12 is in the inversion state, the control section 6 turns off the eye sensor 60 (step S310). In a state where the eye sensor 60 functions, approach of the display section 12 is misidentified as approach of an eye of the user, and the display surface 12A of the display section 12 is turned off. As a result, the user performing self-shooting is not allowed to visually confirm the through image that should be displayed on the display surface 12A.

Subsequently, the viewfinder 20 is allowed to transit from the usage state P3 to the popup state P2, and then the state transition from the popup state P2 to the housed state P1 is further started. Specifically, the movable part 222 of the viewfinder unit 22 is pressed forward so as to be hidden by the decorative member 23, and then the viewfinder unit 22 and the decorative member 23 are pressed downward to be housed in the main body 10. At the time of the state transition from the usage state P3 to the housed state P1, the control section 6 may end the function of the display operation and the like of the viewfinder 20. At this time, the detection section 9B determines, for example, whether the state transition from the popup state P2 to the housed state P1 has been started, namely, whether the viewfinder 20 has started to move from the popup state P2 to the housed state P1 (step S311). When the start of the state transition from the popup state P2 to the housed state P1 is detected, it is determined whether the eye sensor 60 has been turned on (step S312). When the start of the state transition from the popup state P2 to the housed state P1 is not detected, the process at the step S311 is performed again.

When it is determined that the eye sensor 60 is turned on at the step S312, the eye sensor 60 is turned off (step S313). Finally, it is determined whether the power has been turned off (step S314). When it is determined that the power has been already turned off by the operation of the power button 15, the series of operation is ended as is. When it is determined that the power has not been turned off, the power is turned off to end the series of operation (step S315). Note that the control section 6 may continue the shooting mode or may shift to the power saving mode (the sleep mode) without turning off the power after allowing the viewfinder 20 to transit from the popup state P2 to the housed state P1 or turning off the eye sensor 60.

Note that the control section 6 may perform the display operation of only the display section 12 when the viewfinder 20 is not in the usage state P3 at the time of the power-on operation performed by the power button 15. On the other hand, at the time when the power-on operation is performed by the power button 15, when the viewfinder 20 is in the usage state P3, the display operation of both of the display section 12 and the viewfinder 20 may be performed.

As described above, in the third embodiment, turning on and turning off of the eye sensor 60 is performed by the control section 6 according to the state transition of the viewfinder 20. Therefore, it is unnecessary for the user to perform turning on and turning off of the eye sensor 60 as operation separated from the operation of the state transition of the viewfinder 20. Consequently, according to the third embodiment, operability is improved, and smooth shooting by the user becomes possible.

In FIGS. 17A and 17B, the control section 6 turns on the power, activates the display screen of the viewfinder 20, and turns on the eye sensor 60, with the start of the transition from the housed state P1 to the popup state P2 as a trigger. In addition, the control section 6 turns off the eye sensor 60 and turns off the power with the start of the transition from the popup state P2 to the housed state P1 as a trigger. However, it may be performed in the following manner in the present technology. For example, the turning on of the power, the activation of the display screen of the viewfinder 20, and the turning on of the eye sensor 60 may be performed with detection of any of the following (1) to (3) as a trigger.

(1) completion of the transition from the housed state P1 to the popup state P2, that is, arrival of the viewfinder 20 to the popup state P2 after movement from the housed state P1

(2) start of the transition from the popup state P2 to the usage state P3, that is, start of movement of the movable part 222 of the viewfinder unit 22 to the backside of the main body part 221

(3) completion of the transition from the popup state P2 to the usage state P3, that is, completion of the movement of the movable part 222 of the viewfinder unit 22 to the backside of the main body part 221, and arrival of the viewfinder 20 to the usage state P3

Likewise, the turning off of the eye sensor 60 and the turning off of the power may be performed with detection of any of the following (4) to (6) as a trigger.

(4) completion of the transition from the popup state P2 to the housed state P1, that is, arrival of the viewfinder 20 to the housed state P1 after movement from the popup state P2

(5) start of the transition from the usage state P3 to the popup state P2, that is, start of forward movement of the movable part 222 of the viewfinder unit 22 toward the main body part 221

(6) completion of the transition from the usage state P3 to the popup state P2, that is, completion of the forward movement of the movable part 222 of the viewfinder unit 22 toward the main body part 221, and arrival of the viewfinder 20 to the popup state P2

Hereinbefore, although the disclosure has been described with referring to the embodiments, the disclosure is not limited to the above-described embodiments, and various modifications may be made. For example, the configurations of the first moving mechanism 24, the second moving mechanism 25, and the electric moving mechanism 27 are not limited to the examples described in the above-described embodiments, and other configuration may be employed.

Moreover, for example, in the above-described embodiments, the case where the viewfinder 20 is movable in two directions, the upward direction and the backward direction of the main body 10 has been described. However, the viewfinder 20 may be movable in three or more directions without being limited to the two directions. Furthermore, the moving direction and the path of the viewfinder 20 are not particularly limited, and for example, in the case of the vertical position shooting, the viewfinder 20 may project in the lateral direction (the X direction) of the main body 10 and then may advance to the backside of the main body 10 (in the Z direction).

In addition, in the above-described embodiments, the case where the image picked up by the main body 10 is displayed on the display section 12 attached to the main body 10 has been described. However, a display of a smartphone (a multifunctional mobile phone) and a monitor of a personal computer may be used in place of the display section 12.

Furthermore, for example, the shapes, the sizes, the materials, and the like of the respective components described in the above-described embodiments are not limited, and other shapes, sizes, materials may be employed.

Moreover, for example, in the above-described embodiments, the configuration of the image pickup apparatus 1 has been specifically described. However, all of the components are not necessarily provided, and other components may be further provided.

Note that the effects described in the present specification are illustrative and non-limiting. Effects achieved by the technology may be effects other than those described above. Moreover, the present technology may be configured as follows.

(1)
An image pickup apparatus including:
a main body provided with an image pickup section;
a viewfinder having a main body part and a movable part, the viewfinder being capable of performing state transition in which the movable part moves in a first direction with respect to the main body part to reach a usage state; and
a control section configured to perform processing based on the state transition.

(2)
The image pickup apparatus according to (1), wherein the control section performs alert processing when the viewfinder is not in the usage state.

(3)
The image pickup apparatus according to (2), further including
a driving section, wherein
the control section allows the driving section to perform alert operation as the alert processing.

(4)
The image pickup apparatus according to (3), wherein a display section is provided as the driving section, and the control section allows the display section to perform alert display as the alert operation.

(5)
The image pickup apparatus according to (3) or (4), wherein
a speaker is provided as the driving section, and
the control section allows the speaker to generate alert sound as the alert operation.

(6)
The image pickup apparatus according to any one of (3) to (5), wherein
a motor is provided as the driving section, and
the control section allows the motor to generate alert vibration as the alert operation.

(7)
The image pickup apparatus according to any one of (2) to (6), wherein
when the viewfinder is not in the usage state, the movable part is in a state before the movable part moves in the first direction with respect to the main body part to reach the usage state.

(8)
The image pickup apparatus according to (1), wherein the viewfinder is transited from a housed state in which the viewfinder is housed in the main body to a popup state in which the main body part of the viewfinder projects upward from the main body, and then the movable part advances from the popup state to the backside of the main body part to allow the viewfinder to transit to the usage state.

(9)
The image pickup apparatus according to any one of (2) to (7), wherein when the viewfinder is not in the usage state, the movable part is in a state before the movable part moves in the first direction with respect to the main body part.

(10)
The image pickup apparatus according to any one of (1) to (9), wherein the control section selects mode to perform shooting as the processing when the viewfinder is in the usage state.

(11)
The image pickup apparatus according to any one of (1) to (10), wherein
the viewfinder is an electronic viewfinder, and
the control section activates the electronic viewfinder when the electronic viewfinder is in the usage state.

(12)
The image pickup apparatus according to any one of (1) to (11), further including
a display section, wherein
the control section starts display operation of the display section based on the state transition.

(13)
The image pickup apparatus according to (12), wherein
the viewfinder is an electronic viewfinder, and
the control section allows the display section to display a plurality of pieces of information, and allows the electronic viewfinder to display part of the plurality of pieces of information.

(14)
The image pickup apparatus according to any one of (1) to (13), wherein
the viewfinder is an electronic viewfinder, and
the control section stops operation of the electronic viewfinder at a time of transition from the usage state to a housed state in which the viewfinder is housed in the main body.

(15)
The image pickup apparatus according to any one of (1) to (14), wherein the control section turns on a power at a time of transition from a housed state in which the viewfinder is housed in the main body to the usage state.

(16)
The image pickup apparatus according to any one of (1) to (15), wherein the control section turns off a power at a time of transition from the usage state to a housed state in which the viewfinder is housed in the main body.

(17)
The image pickup apparatus according to any one of (1) to (16), further including
a memory section, wherein
the viewfinder further includes a visibility adjustment section that is configured to perform visibility adjustment according to a user, and
data of the visibility adjustment according to the user by the visibility adjustment section is stored in the memory section.

(18)
The image pickup apparatus according to (17), further including
an operation button, wherein
the data of the visibility adjustment according to the user is stored in the memory section in response to operation of the operation button.

(19) The image pickup apparatus according to (18), wherein the operation button is a release button used to perform shooting operation.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1, 1A Image pickup apparatus
2 Image pickup section
2A Image pickup device
3 Image signal processing section
4 Encoding-decoding section
5 Image memory
6 Control section
7 Recording-reproducing section
8 Input section
9A, 9B Detection section
10 Main body
10A Front surface
10B Back surface
10C Top surface
10D Side surface
10E Viewfinder operation section
11 Body mount
12 Display section
13 Opening
14 Stroboscope
15 Power button
16 Release button
17 Mode setting dial
20 Viewfinder
21 Peep window
22 Viewfinder unit
221 Main body part
222 Movable part
22A Eyepiece surface
23 Decorative member
24 First moving mechanism
25 Second moving mechanism
26 Visibility adjustment section
27 Electric moving mechanism
30 Image pickup lens unit
30A Lens
30B Lens barrel
30C, 30D Lens ring
31, 51 Base frame
32, 52 Slide frame
33 First elastic member
34 hooking mechanism
41 Second elastic member
53 Rack
54 Motor
54A Worm gear
60, 60A Eye sensor
P1 Housed state
P2 Popup state
P3 Usage state

The invention claimed is:
1. An image pickup apparatus, comprising:
a main body;
an image pickup section;
a viewfinder that comprises a main body part and a movable part, the viewfinder is configured to:
transition from a first state to a second state, wherein the viewfinder is inside the main body of the image pickup apparatus in the first state, and the viewfinder is projected outside of the main body of the image pickup apparatus in the second state based on a movement of the viewfinder in a first direction,
transition from the second state to a third state, wherein the movable part is moved in a second direction with respect to the main body part of the viewfinder in the third state, wherein the second direction is different from the first direction; and
a control section configured to perform a process based on the transition from the second state to the third state.

2. The image pickup apparatus according to claim 1, wherein the control section is further configured to generate an alert based on the viewfinder that is not in the third state.

3. The image pickup apparatus according to claim 2, further comprising a driving section, wherein the control section is further configured to control the driving section to perform an alert operation based on the alert.

4. The image pickup apparatus according to claim 3, wherein the driving section comprises a display section, and the control section is further configured to control the display section to display the alert as the alert operation.

5. The image pickup apparatus according to claim 3, wherein the driving section comprises a speaker, and the control section is further configured to control the speaker to generate an alert sound as the alert operation.

6. The image pickup apparatus according to claim 3, wherein the driving section comprises a motor, and the control section is further configured to control the motor to generate alert vibration as the alert operation.

7. The image pickup apparatus according to claim 2, wherein the movable part is in a fourth state before the movable part moves in the second direction with respect to the main body part to reach the third state.

8. The image pickup apparatus according to claim 2, wherein the movable part is in a fourth state before the movable part moves in the second direction with respect to the main body part.

9. The image pickup apparatus according to claim 1, wherein the control section is further configured to select a shooting mode as the process, based on the viewfinder that is in the third state.

10. The image pickup apparatus according to claim 1, wherein
the viewfinder is an electronic viewfinder, and
the control section is further configured to activate the electronic viewfinder based on the electronic viewfinder that is in the third state.

11. The image pickup apparatus according to claim 1, further comprising a display section, wherein
the control section is further configured control a display operation of the display section based on the transition from the second state to the third state.

12. The image pickup apparatus according to claim 11, wherein
the viewfinder is an electronic viewfinder, and
the control section is further configured to:
control the display section to display a plurality of pieces of information, and
control the electronic viewfinder to display part of the plurality of pieces of information.

13. The image pickup apparatus according to claim 1, wherein the viewfinder is an electronic viewfinder, the first state is a housed state and the third state is a usage state, and the control section is further configured to stop an operation of the electronic viewfinder based on a transition of the viewfinder from the usage state to the housed state.

14. The image pickup apparatus according to claim 1, wherein the first state is a housed state and the third state is a usage state, and the control section is further configured to turn on a power of the image pickup apparatus based on a transition from the housed state to the usage state.

15. The image pickup apparatus according to claim 1, wherein the first state is a housed state and the third state is a usage state, the control section is further configured to turn a power of the image pickup apparatus based on a transition from the usage state to the housed state.

16. The image pickup apparatus according to claim 1, further comprising a memory section, wherein the viewfinder further includes a visibility adjustment section that is configured to perform a visibility adjustment operation based on a user, and the memory section is configured to store data of the visibility adjustment operation.

17. The image pickup apparatus according to claim 16, further comprising an operation button, wherein the data of the visibility adjustment operation is stored in the memory section based on an operation of the operation button.

18. The image pickup apparatus according to claim 17, wherein the operation button is a release button used to perform a shooting operation.

19. An image pickup apparatus, comprising:

a main body;

a memory section;

an image pickup section;

a viewfinder that comprises a main body part, a movable part, and a visibility adjustment section, wherein the viewfinder is configured to perform state transition in which the movable part moves in a first direction with respect to the main body part to reach a usage state, wherein the visibility adjustment section is configured to perform a visibility adjustment operation based on a user, and the memory section is configured to store data of the visibility adjustment operation; and a control section configured to perform a process based on the state transition.

* * * * *